United States Patent
Kaviani et al.

(10) Patent No.: US 10,002,100 B2
(45) Date of Patent: Jun. 19, 2018

(54) ACTIVE-BY-ACTIVE PROGRAMMABLE DEVICE

(71) Applicant: Xilinx, Inc., San Jose, CA (US)

(72) Inventors: Alireza S. Kaviani, San Jose, CA (US); Pongstorn Maidee, San Jose, CA (US); Ivo Bolsens, San Jose, CA (US)

(73) Assignee: XILINX, INC., San Jose, CA (US)

( * ) Notice: Subject to any disclaimer, the term of this patent is extended or adjusted under 35 U.S.C. 154(b) by 159 days.

(21) Appl. No.: 15/013,696

(22) Filed: Feb. 2, 2016

(65) Prior Publication Data
US 2017/0220509 A1 Aug. 3, 2017

(51) Int. Cl.
| | |
|---|---|
| *G06F 13/36* | (2006.01) |
| *G06F 13/362* | (2006.01) |
| *G06F 13/00* | (2006.01) |
| *G06F 13/40* | (2006.01) |

(52) U.S. Cl.
CPC ........ *G06F 13/4068* (2013.01); *G06F 13/362* (2013.01); *G06F 13/4031* (2013.01)

(58) Field of Classification Search
None
See application file for complete search history.

(56) References Cited

U.S. PATENT DOCUMENTS

| | | | |
|---|---|---|---|
| 5,585,282 A | 12/1996 | Wood et al. | |
| 5,696,031 A | 12/1997 | Wark | |
| 5,729,894 A | 3/1998 | Rostoker et al. | |
| 6,071,754 A | 6/2000 | Wark | |
| 6,140,149 A | 10/2000 | Wark | |
| 6,399,416 B1 | 6/2002 | Wark | |
| 6,500,760 B1 | 12/2002 | Peterson et al. | |
| 6,501,165 B1 | 12/2002 | Farnworth et al. | |
| 6,674,971 B1 * | 1/2004 | Boggess ............ | H04B 10/2725 385/14 |

(Continued)

OTHER PUBLICATIONS

Shokrollahi, Amin et al., "A Pin-Efficient 20.83 Gb/s/wire 0.94pJ/bit Forwarded Clock CNRZ-5-Coded SerDes up to 12mm for MCM Packages in 28nm CMOS," Proc. of the 2016 IEEE International Solid-State Circuits Conference, Feb. 2, 2016, pp. 1-3, IEEE, Piscataway, New Jersey, USA.

(Continued)

*Primary Examiner* — Michael Sun
(74) *Attorney, Agent, or Firm* — Robert M. Brush

(57) ABSTRACT

An example integrated circuit (IC) system includes a package substrate having a programmable integrated circuit (IC) and a companion IC mounted thereon, the programmable IC including a programmable fabric and the companion IC including application circuitry. The IC system further includes a system-in-package (SiP) bridge including a first SiP IO circuit disposed in the programmable IC, a second SiP IO circuit disposed in the companion IC, and conductive interconnect on the package substrate electrically coupling the first SiP IO circuit and the second SiP IO circuit. The IC System further includes first aggregation and first dispersal circuits in the programmable IC coupled between the programmable fabric and the first SiP IO circuit. The IC system further includes second aggregation and second dispersal circuits in the companion IC coupled between the application circuitry and the second SiP IO circuit.

19 Claims, 18 Drawing Sheets

(56) References Cited

U.S. PATENT DOCUMENTS

| | | | |
|---|---|---|---|
| 7,017,137 B2* | 3/2006 | Wadland | G06F 17/5077 |
| | | | 716/112 |
| 7,064,579 B2 | 6/2006 | Madurawe | |
| 7,068,072 B2 | 6/2006 | New | |
| 7,075,175 B2 | 7/2006 | Kazi et al. | |
| 7,091,598 B2 | 8/2006 | Fujita et al. | |
| 7,132,311 B2 | 11/2006 | Akiba et al. | |
| 7,301,234 B2 | 11/2007 | Lee | |
| 7,454,502 B2* | 11/2008 | Grimm | G06F 9/5083 |
| | | | 707/999.01 |
| 7,501,696 B2 | 3/2009 | Koyama et al. | |
| 7,609,561 B2 | 10/2009 | Cornwell et al. | |
| 7,701,251 B1 | 4/2010 | Rahman et al. | |
| 7,919,845 B2 | 4/2011 | Karp et al. | |
| 7,943,436 B2* | 5/2011 | McElvain | G06F 17/5077 |
| | | | 257/659 |
| 8,443,323 B1* | 5/2013 | McGowan | G06F 17/5068 |
| | | | 703/16 |
| 8,760,328 B1 | 6/2014 | Koay et al. | |
| 8,901,748 B2 | 12/2014 | Manusharow et al. | |
| 9,443,561 B1* | 9/2016 | Roberts | G11C 5/02 |
| 2002/0066956 A1 | 6/2002 | Tagauchi | |
| 2004/0178819 A1* | 9/2004 | New | H01L 24/11 |
| | | | 326/40 |
| 2005/0007147 A1 | 1/2005 | Young | |
| 2005/0089027 A1* | 4/2005 | Colton | H04Q 11/0005 |
| | | | 370/380 |
| 2006/0237835 A1 | 10/2006 | Fujita et al. | |
| 2007/0001168 A1 | 1/2007 | Kirby et al. | |
| 2007/0195716 A1* | 8/2007 | Richter | G06F 13/4247 |
| | | | 370/258 |
| 2008/0297192 A1 | 12/2008 | Van Wageningen et al. | |
| 2009/0039492 A1 | 2/2009 | Kang et al. | |
| 2009/0210480 A1* | 8/2009 | Sivasubramaniam | G06Q 30/02 |
| | | | 709/203 |
| 2011/0135301 A1* | 6/2011 | Myslinski | H04B 10/572 |
| | | | 398/34 |
| 2011/0206381 A1 | 8/2011 | Ji et al. | |
| 2011/0215472 A1 | 9/2011 | Chandrasekaran | |
| 2013/0195002 A1* | 8/2013 | Walker | H04W 4/00 |
| | | | 370/312 |
| 2013/0214432 A1* | 8/2013 | Wu | H01L 23/147 |
| | | | 257/782 |
| 2013/0336039 A1* | 12/2013 | Frans | G11C 5/02 |
| | | | 365/51 |
| 2014/0049932 A1* | 2/2014 | Camarota | H01L 23/145 |
| | | | 361/807 |
| 2015/0358084 A1 | 10/2015 | Lesea et al. | |
| 2015/0358085 A1 | 12/2015 | Trimberger et al. | |

OTHER PUBLICATIONS

Poulton, John W. et al., "A 0.54 pJ/b 20 Gb/s Ground-Referenced Single-Ended Short-Reach Serial Link in 28 nm CMOS For Advanced Packaging Applications," IEEE Journal of Solid-State Circuits, Dec. 2013, pp. 3206-3218, vol. 48, No. 12, IEEE, Piscataway, New Jersey, USA.

Specification and drawings for U.S. Appl. No. 14/674,321, filed Mar. 31, 2015, Karp et al.

Gupta, Subhash et al., "Techniques for Producing 3D ICs with High-Density Interconnect," Sep. 29, 2004, Proc. of the 21st International Multilevel Interconnection Conference, IEEE, Piscataway, New Jersey, USA.

Tezzaron Semiconductor, "FaStack Creates 3D Integrated Circuits," copyright 2002, revised May 23, 2007, pp. 1-3, Tezzaron Semiconductor, Naperville, Illinois, USA.

Tezzaron Semiconductor, "FaStack Stacking Technology," Feb. 2004, Rev. 1.4, pp. 1-4, Tezzaron Semiconductor, Naperville, Illinois, USA.

* cited by examiner

US 10,002,100 B2

ACTIVE-BY-ACTIVE PROGRAMMABLE DEVICE

TECHNICAL FIELD

Examples of the present disclosure generally relate to electronic circuits and, in particular, to an active-by-active programmable device.

BACKGROUND

Modern programmable devices, such as field programmable gate arrays (FPGAs), are growing in size and becoming more heterogeneous. Their cost is also rapidly increasing due to both more expensive process technology and increasing overhead of programmability for a majority of applications that do not require all of the heterogeneous circuit blocks. Many of these large circuit blocks, such as general purpose input/output (IO) or multi-gigabit serial transceivers (MGTs), do not require the benefits of new process technology. Thus, the traditional monolithic architectures no longer meet the cost requirements of the market, leading to the development of system-in-package (SiP) devices. The majority of SiP solutions, however, rely on advanced packaging techniques, such as the use of expensive interposers or complex three-dimensional die stacking. As such, the added cost of these SiP solutions limits the benefits to high-end or niche applications with low production volume.

SUMMARY

Techniques for providing an active-by-active programmable device are described. In an example, an integrated circuit (IC) system includes a package substrate having a programmable integrated circuit (IC) die and a companion IC die mounted thereon, the programmable IC die including a programmable fabric and the companion IC die including application circuitry. The IC system further includes a system-in-package (SiP) bridge including a first SiP IO circuit disposed in the programmable IC die, a second SiP IO circuit disposed in the companion IC die, and conductive interconnect on the package substrate electrically coupling the first SiP IO circuit and the second SiP IO circuit. The IC System further includes first aggregation and first dispersal circuits in the programmable IC die coupled between the programmable fabric and the first SiP IO circuit. The IC system further includes second aggregation and second dispersal circuits in the companion IC die coupled between the application IO and the second SiP IO circuit.

In another example, a programmable integrated circuit (IC) includes a system-in-package (SiP) input/output (IO) circuit coupled to a companion IC through external conductive interconnect; a programmable fabric without at least a portion of application circuitry; and aggregation and dispersal circuits coupled between the programmable fabric and the SiP IO circuit.

In another example, a method of transmitting data from a programmable integrated circuit (IC) in an IC system includes coupling the data to a first system-in-package (SiP) IO circuit through a plurality of channels of an aggregation circuit in the programmable IC. The method further includes transmitting the data from the plurality of channels over a smaller number of physical channels between the programmable IC and a companion IC. The method further includes receiving the data from the plurality of physical channels at a second SiP IO circuit in the companion IC. The method further includes coupling the data from the second SiP IO circuit to application circuitry in the companion IC through a plurality of channels of a dispersal circuit in the companion IC. The method further includes transmitting the data from the application IO circuits.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
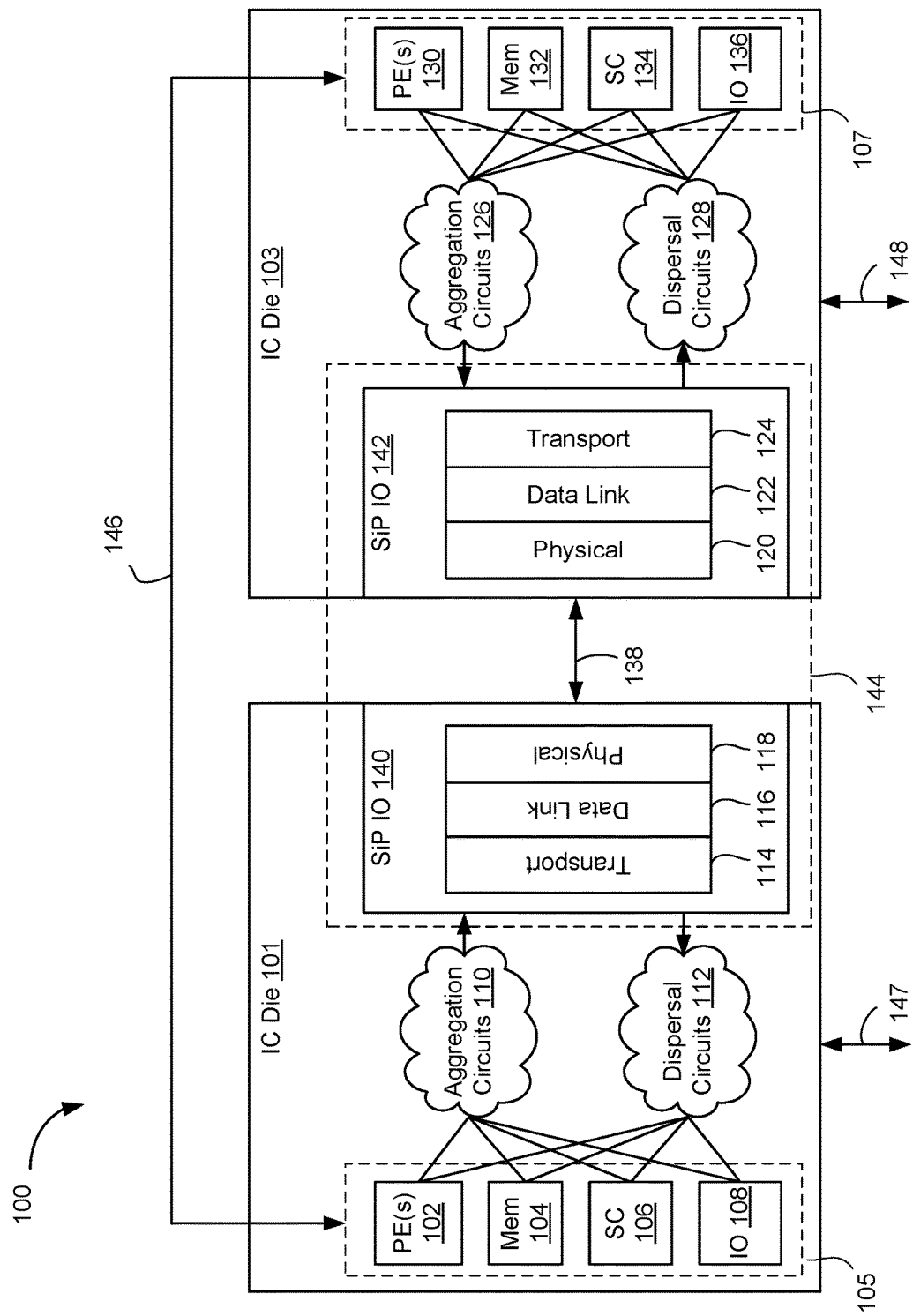
FIG. 1 is a block diagram depicting an integrated circuit (IC) system according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

An active-by-active programmable device is described. In an example, a system-in-package (SiP)-based programmable device employs a multi-chip module (MCM) package. The MCM package includes a programmable integrated circuit (IC), such as a field programmable gate array (FPGA), and one or more companion integrated circuit (IC) devices disposed on a package substrate. The programmable IC and the companion ICs are disposed side-by-side on the package substrate (e.g., active-by-active). The connection between the programmable IC and each companion IC device is implemented using a high-bandwidth SiP bridge. The SiP bridge can be implemented using a low number of wires, allowing use of the MCM package rather than an expensive interposer. Data to be sent from one device to another is aggregated into a collective bandwidth and delivered over the SiP bridge. Aggregate data received on the SiP bridge is delivered to the destination through a systematic disperse mechanism. In examples described herein, the SiP bridge is implemented using a protocol stack comprising at least physical and data link layers. Higher layers can also be employed, such as a transport layer. The physical layer can be any ultra-short reach (USR) serializer/deserializer (SerDes) technology that meets certain requirements detailed herein. As described further herein, the data link layer is configured to time-multiplex the aggregated data across the available physical channels in a manner that avoids congestion at the destination. Each device can include a system-level interconnect to facilitate aggregation and dispersal of data between application circuits and SiP bridge(s).

In examples, a companion IC die includes some or all of the application input/output (IO) circuits of the SiP device. Thus, the programmable IC can be constructed without such application IO circuits. Removal of application IO circuits from the programmable IC frees die area for use by other circuits. Also, the programmable IC can be manufactured using newer process technology, taking advantage of newer process technology features, while the companion IC having the application IO circuits can be manufactured using older, less expensive process technology. As a result, the overall solution will deliver the same functionality at a lower cost. The programmable IC and companion IC device are connected by a SiP bridge. Each of the programmable IC and the companion IC device include a SiP IO circuit defining an endpoint of the SiP bridge. Each of the programmable IC and the companion IC can include system-level interconnect to provide aggregation and dispersal of data between application circuits and the SiP IO circuits. One example of a system-level interconnect for use in the programmable IC is a system-level interconnect ring (SIR). As described further herein, the SIR allows for minimal augmentation of the programmable fabric and the design tools used to implement circuits for the programmable IC. These and other aspects can be understood with reference to the following figures.

FIG. 1 is a block diagram depicting an integrated circuit (IC) system 100 according to an example. The IC system 100 includes an IC die 101 coupled to an IC die 103. In an example, the IC die 101 and the IC die 103 are part of a multi-chip module (MCM) forming a System-in-Package (SiP). The IC die 101 includes application circuits 105, aggregation circuits 110, dispersal circuits 112, and a SiP input/output circuit (SiP IO 140). In an example, the application circuits 105 include various components, such as one or more processing elements (PE(s) 102), memory (mem 104), support circuits (SC 106), and input/output circuits (IO 108). In other examples, one or more of the components 102-108 may be omitted from the application circuits 105. Each of the components 102 through 108 of the application circuits 105 can be coupled to both the aggregation circuits 110 and the dispersal circuits 112. Alternatively, one or more of the components 102-108 may be coupled only to one of the aggregation circuits 110 or the dispersal circuits 112. The aggregation circuits 110 and the dispersal circuits 112 are each coupled to an internal interface of the SiP IO 140.

In an example, SiP IO 140 implements multiplexed IO logic having transport logic 114, a data link logic 116, and physical logic 118. In the example shown, the multiplexed IO logic is implemented entirely within SiP IO 140. In other examples, a given layer of the multiplexed IO logic or a portion thereof can be implemented in the application circuits 105. In an example, the transport logic 114 is implemented in the application circuits 105 and the data link logic 116 and the physical logic 118 are implemented in the SiP IO 140. In an example, an arbitration portion of the data link logic 116 is implemented in the application circuits 105 and multiplexing logic for the data link logic 116 is implemented in the SiP IO 140.

The IC die 103 can include similar circuitry as the IC die 101. In the example shown in FIG. 1, the IC die 103 includes application circuits 107, aggregation circuits 126, dispersal circuits 128, and a SiP IO 142. In an example, the application circuits 107 include various components, such as PE(s) 120, memory (mem 132), support circuits (SC 134), and input/output circuits (IO 136). In other examples, one or more of the components 130-136 may be omitted from the application circuits 107. Each of the components 130 through 136 of the application circuits 107 can be coupled to both the aggregation circuits 126 and the dispersal circuits 128. Alternatively, one or more of the components 130-136 may be coupled only to one of the aggregation circuits 126 or the dispersal circuits 128. The aggregation circuits 126 and the dispersal circuits 128 are each coupled to an internal interface of the SiP IO 142. Similar to the SiP IO 140, the SiP IO 142 implements multiplexed IO logic having transport logic 124, a data link logic 122, and physical logic 120. In the example shown, the multiplexed IO logic is implemented entirely within SiP IO 142. In other examples, as described above with respect to the IC die 101, a given logic layer of the multiplexed IO logic or a portion thereof can be implemented in the application circuits 107.

The IC die 101 and the IC die 103 are coupled by a SiP bridge 144. The SiP bridge 144 includes the SiP IO 140, SiP IO 142, and signal paths 138. An external interface of the SiP IO 140 is coupled to an external interface of the SiP IO 142 by the signal paths 138. The physical logic 118/120 implement a physical layer of the SiP bridge 144 and support a plurality of physical channels. The data link logic 116/122 implement a data link layer of the SiP bridge 144 and support a plurality of channels on each side of the SiP bridge 144 (referred to as aggregation channels and dispersal channels). The transport logic 114/124 implement a transport layer of the SiP bridge 144. Various transport layers can be employed, including connection-less or connection-based transport layers. The transport layer can provide for packetization, de-packetization, error correction, packet ordering, and the like known in the art.

The application circuits 105 can include a number of outputs coupled to channels of the aggregation circuits 110. The aggregation circuits 110 selectively couple outputs of the application circuits 105 among internal inputs of the SiP IO 140 (referred to as source ports). For example, the SiP IO 140 can include M source ports coupled to M aggregation channels of the aggregation circuits 110, where M is a positive integer. The aggregation circuits 110 can selectively couple outputs of the application circuits 105 to the M source ports of the SiP IO 140 through the M aggregation channels. The SiP IO 140 can include K external outputs driving K physical channels implemented over the signal paths 138, where K is a positive integer. In an example, K is less than M and the SiP IO 140 multiplexes the M source ports among the K external outputs. The SiP IO 142 can include K external inputs receiving from the K physical channels. The SiP IO 142 de-multiplexes the K external inputs among N internal outputs, where N is a positive integer (referred to as destination ports). In an example, N is greater than K. The dispersal circuits 128 selectively couple the N destination ports of the SiP IO 142 among inputs of the application circuits 107 through N dispersal channels.

Likewise, the application circuits 107 can include a number of outputs coupled to aggregation channels of the aggregation circuits 126. The aggregation circuits 126 selectively couple outputs of the application circuits 107 among source ports of the SiP IO 142. For example, the SiP IO 142 can include N' source ports coupled to N' aggregation channels of the aggregation circuits 126, where N' is a positive integer. The aggregation circuits 126 can selectively couple outputs of the application circuits 107 to the N' source ports of the SiP IO 142 through the N' aggregation channels. The SiP IO 142 can include K' external outputs driving K' physical channels implemented over the signal paths 138, where K' is a positive integer. In an example, K' is less than N' and the SiP IO 142 multiplexes the N' source ports among the K' external outputs. The SiP IO 140 can include K' external inputs receiving from the K' physical channels. The SiP IO 140 de-multiplexes the K' external inputs among M' destination ports, where M' is a positive integer. In an example, M' is greater than K'. The dispersal circuits 112 selectively couple the M' destination ports of the SiP IO 140 among M' inputs of the application circuits 105 through M' dispersal channels.

In some examples, K=K' such that the the SiP bridge 144 supports an equal number of physical channels in each direction between the IC die 101 and the IC die 103. To transmit data from the IC die 101, the aggregation circuits 110 aggregate output of the application circuits 105 into M aggregation channels and the SiP IO 140 multiplexes the M aggregation channels across K physical channels. To receive the data at the IC die 103, the SiP IO 142 de-multiplexes K physical channels into N channels and the dispersal circuits 128 disperse the N dispersal channels to inputs of the application circuits 107. Likewise, to transmit data from the IC die 103, the aggregation circuits 126 aggegate output of the application circuits 107 into N' aggregation channels and the SiP IO 142 multiplexes the N' aggregation channels across K' physical channels. To receive the data at the IC die 101, the SiP IO 140 de-multiplexes K' channels received from the K' physical channels into M' dispersal channels and the dispersal circuits 112 disperse the M' dispersal channels to inputs of the application circuits 105. In some examples, M=M' and N=N' such that aggregation circuits 110 and the dispersal circuits 112 provide a total of 2*M channels to the application circuits 105 and the aggregation circuits 126 and the dispersal circuits 128 provide a total of 2*N channels to the application circuits 107. In some examples, M=M'=N=N'.

In an example, the application circuits 105 and the application circuits 107 exchange packetized data over the SiP bridge 144. The transport logic 114 forms the output of the application circuits 105 into packets each including w bits, where w is a positive integer. The transport logic 114 also de-packetizes data received from the dispersal circuits 112. The transport logic 124 can function similarly to the transport logic 114.

The data link logic 116 organizes the output of the aggregation circuits 110 into a plurality of aggregation channels (e.g., M aggregation channels), where each aggregation channel is w-bits wide for providing a w-bit packet. That is, the aggregation circuits 110 include a multi-channel output. Likewise, the data link logic 116 divides the inputs of the dispersal circuits 112 into a plurality of dispersal channels (e.g., M' dispersal channels), where each dispersal channel is w-bits wide for receiving a w-bit packet. That is, the dispersal circuits 112 include a multi-channel input. The data link logic 116 maintains a transmit queue for each aggregation channel. The data link logic 116 arbitrates among the transmit queues to select packets to be transmitted over the available physical channels by the physical logic 118. The data link logic 116 also de-multiplexes physical channels into the available dispersal channels of the dispersal circuits 112. The data link logic 122 can function similarly to the data link logic 116.

The physical logic 118 can serialize packets in the available output physical channels for transmission as signals across the signal paths 138. The physical logic 118 can also de-serialize signals received from the signal paths 138 into the available input physical channels. The physical logic 120 can function similarly to the physical logic 118.

In an example, the application circuits 105 can be coupled to the application circuits 107 directly over one or more direct signal paths 146. That is, there can be some communication between the IC die 101 and the IC die 103 that does not traverse the SiP bridge 144. Further, the IC die 101 can include an external interface 147 that can be used to send and receive signals to other external circuits, as well as to receive power and ground. Likewise, the IC die 103 can include an external interface 148 that can be used to send and receive signals to other external circuits, as well as to receive power and ground.

In the example shown in FIG. 1, the IC die 101 includes SiP IO for one SiP bridge to one other IC die. In other examples, an IC die can include multiple SiP IOs for multiple SiP bridges to multiple IC die. In such embodiments, the IC die can include multiple instances of aggregation and dispersal circuits to couple the application circuits therein to the multiple SiP bridges.

Figure 2:
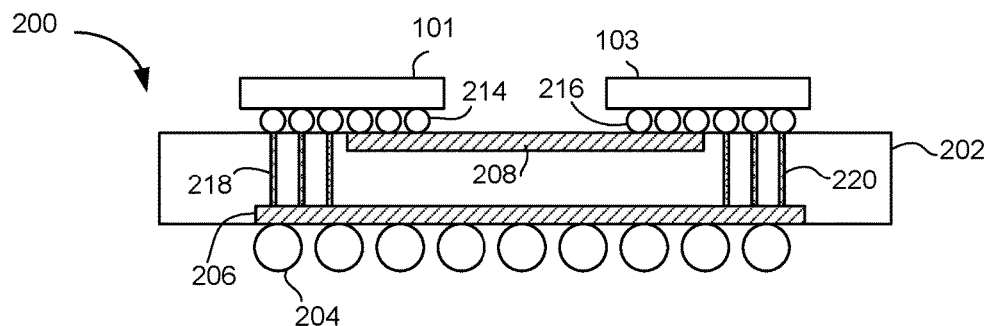
FIG. 2 is a cross-section of a multi-chip module (MCM) according to an example.

FIG. 2 is a cross-section of a MCM 200 according to an example. The MCM 200 can implement the IC system 100 described above. The MCM 200 includes the IC die 101 and the IC die 103 mounted on a package substrate 202. The IC die 101 is electrically and mechanically coupled to the package substrate 202 by contacts 214. The IC die 103 is electrically and mechanically coupled to the package substrate 202 by contacts 216. The contacts 214 and the contacts 216 can be solder balls, solder bumps, or the like. The package substrate 202 includes conductive interconnect 208 disposed at or near the surface to which the IC die 101 and the IC die 103 are mounted. The package substrate 202 includes conductive interconnect 206 disposed at or near the opposite surface. The conductive interconnect 208 and the conductive interconnect 206 each includes one or more metal layers having a specific pattern. Some of the contacts 214 of the IC die 101 are electrically coupled to the conductive interconnect 208. Some of the contacts 216 of the IC die 103 are electrically coupled to the conductive interconnect 208. Others of the contacts 214 are electrically coupled to the conductive interconnect 206 through vias 218. Others of the contacts 216 are electrically coupled to the conductive interconnect 206 through vias 220. The conductive interconnect 206 is electrically coupled to contacts 204. The contacts 204 can be solder balls, solder bumps, or the lie.

The contacts 204 comprise the external pins of the MCM 200. The MCM 200 can be mounted to a circuit board. Conductors on the circuit board can be electrically coupled to the IC die 101 and the IC die 103 through the contacts 204 of the package substrate 202. Within the MCM 200, the IC die 101 is electrically coupled to the IC die 103 through the conductive interconnect 208. To implement the IC system 100 described above, the conductive interconnect 208 is patterned to form the signal paths 138 between the IC die 101 and the IC die 103. In an example, the conductive interconnect 208 is also patterned to form the dedicated signal path(s) 146 (if present). The external interface of the SiP IO 140 is coupled the signal paths 138 formed in the conductive interconnect 208 through some of the contacts 214. Likewise, the external interface of the SiP IO 142 is coupled to the signal paths 138 formed in the conductive interconnect 208 through some of the contacts 216.

Figure 3:
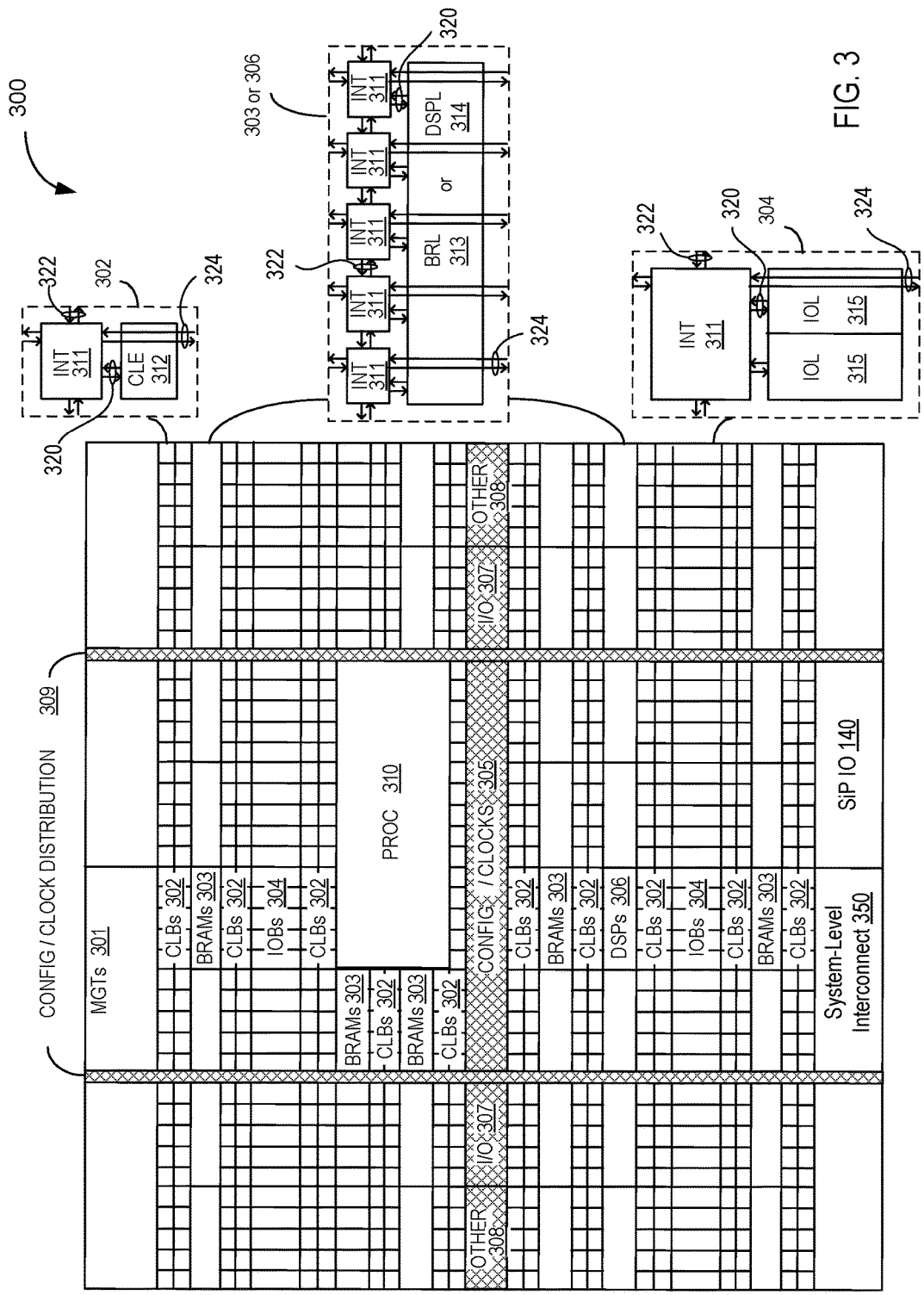
FIG. 3 illustrates an example field programmable gate array (FPGA) architecture.

In an example, at least one of the IC die 101 and the IC die 103 comprises a programmable IC, such as a field programmable gate array (FPGA) or the like. FIG. 3 illustrates an FPGA architecture 300 that includes a large number of different programmable tiles including multi-gigabit transceivers ("MGTs") 301, configurable logic blocks ("CLBs") 302, random access memory blocks ("BRAMs") 303, input/output blocks ("IOBs") 304, configuration and clocking logic ("CONFIG/CLOCKS") 305, digital signal processing blocks ("DSPs") 306, specialized input/output blocks ("I/O") 307 (e.g., configuration ports and clock ports), and other programmable logic 308 such as digital clock managers, analog-to-digital converters, system monitoring logic, and so forth. Some FPGAs also include dedicated processor blocks ("PROC") 310.

In some FPGAs, each programmable tile can include at least one programmable interconnect element ("INT") 311 having connections to input and output terminals 320 of a programmable logic element within the same tile, as shown by examples included at the top of FIG. 3. Each programmable interconnect element 311 can also include connections to interconnect segments 322 of adjacent programmable interconnect element(s) in the same tile or other tile(s). Each programmable interconnect element 311 can also include connections to interconnect segments 324 of general routing resources between logic blocks (not shown). The general routing resources can include routing channels between logic blocks (not shown) comprising tracks of interconnect segments (e.g., interconnect segments 324) and switch blocks (not shown) for connecting interconnect segments. The interconnect segments of the general routing resources (e.g., interconnect segments 324) can span one or more logic blocks. The programmable interconnect elements 311 taken together with the general routing resources implement a programmable interconnect structure ("programmable interconnect") for the illustrated FPGA.

In an example implementation, a CLB 302 can include a configurable logic element ("CLE") 312 that can be programmed to implement user logic plus a single programmable interconnect element ("INT") 311. A BRAM 303 can include a BRAM logic element ("BRL") 313 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 306 can include a DSP logic element ("DSPL") 314 in addition to an appropriate number of programmable interconnect elements. An IOB 304 can include, for example, two instances of an input/output logic element ("IOL") 315 in addition to one instance of the programmable interconnect element 311. As will be clear to those of skill in the art, the actual I/O pads connected, for example, to the I/O logic element 315 typically are not confined to the area of the input/output logic element 315.

In the pictured example, a horizontal area near the center of the die (shown in FIG. 3) is used for configuration, clock, and other control logic. Vertical columns 309 extending from this horizontal area or column are used to distribute the clocks and configuration signals across the breadth of the FPGA.

Some FPGAs utilizing the architecture illustrated in FIG. 3 include additional logic blocks that disrupt the regular columnar structure making up a large part of the FPGA. The additional logic blocks can be programmable blocks and/or dedicated logic. For example, processor block 310 spans several columns of CLBs and BRAMs. The processor block 310 can various components ranging from a single microprocessor to a complete programmable processing system of microprocessor(s), memory controllers, peripherals, and the like.

Note that FIG. 3 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 3 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In an example, the IC die 101 includes a programmable fabric having the FPGA architecture 300. Thus, the IC die 101 further includes the SiP IO 140 and a system-level interconnect 350. The system-level interconnect 350 includes the aggregation circuits 110 and the dispersal circuits 112. In an example, the system-level interconnect 350 comprises a system-level interconnect ring (SIR). Various examples of an SIR are described below. In general, the system-level interconnect 350 provides an interface between the programmable fabric and the SiP IO 140. In an example, the system-level interconnect 350 can be configured in similar fashion to the programmable fabric (e.g., via loading of a configuration bitstream). In other examples, the system-level interconnect 350 can be dynamically programmed during operation of the IC die 101.

In an example, the SiP IO 140 provides an IO interface that circuits configured in the programmable fabric can use to communicate with the IC die 103 over the SiP bridge 144. Circuits can use the application IO of the FPGA architecture 300, such as the IOBs 304, MGTs 301, and any other IOs (e.g., memory IOs, custom IOs, etc), for additional IO to other external circuits. In the example of FIG. 3, the FPGA architecture 300 includes both the SiP IO 140 and application IO.

In other examples described in more detail below, at least a portion of the application IO can be disposed external to an FPGA, such as in a companion IC of a MCM. For example, the IC die 101 having an FPGA architecture can be constructed with only the SiP IO 140. That is, the IOBs 304 and MGTs 301 are removed from the FPGA architecture 300. All of the application IO can be disposed in the IC die 103. The programmable fabric in the IC die 101 can access the application IO in the IC die 103 using the SiP bridge 144. In some examples, the IC die 101 having an FPGA architecture can include some dedicated IO in addition to the SiP IO, such as configuration IO, JTAG IO, and the like. This dedicated IO is used for programming and/or testing the FPGA and not used as application IO for circuits configured in the programmable fabric.

Figure 4:
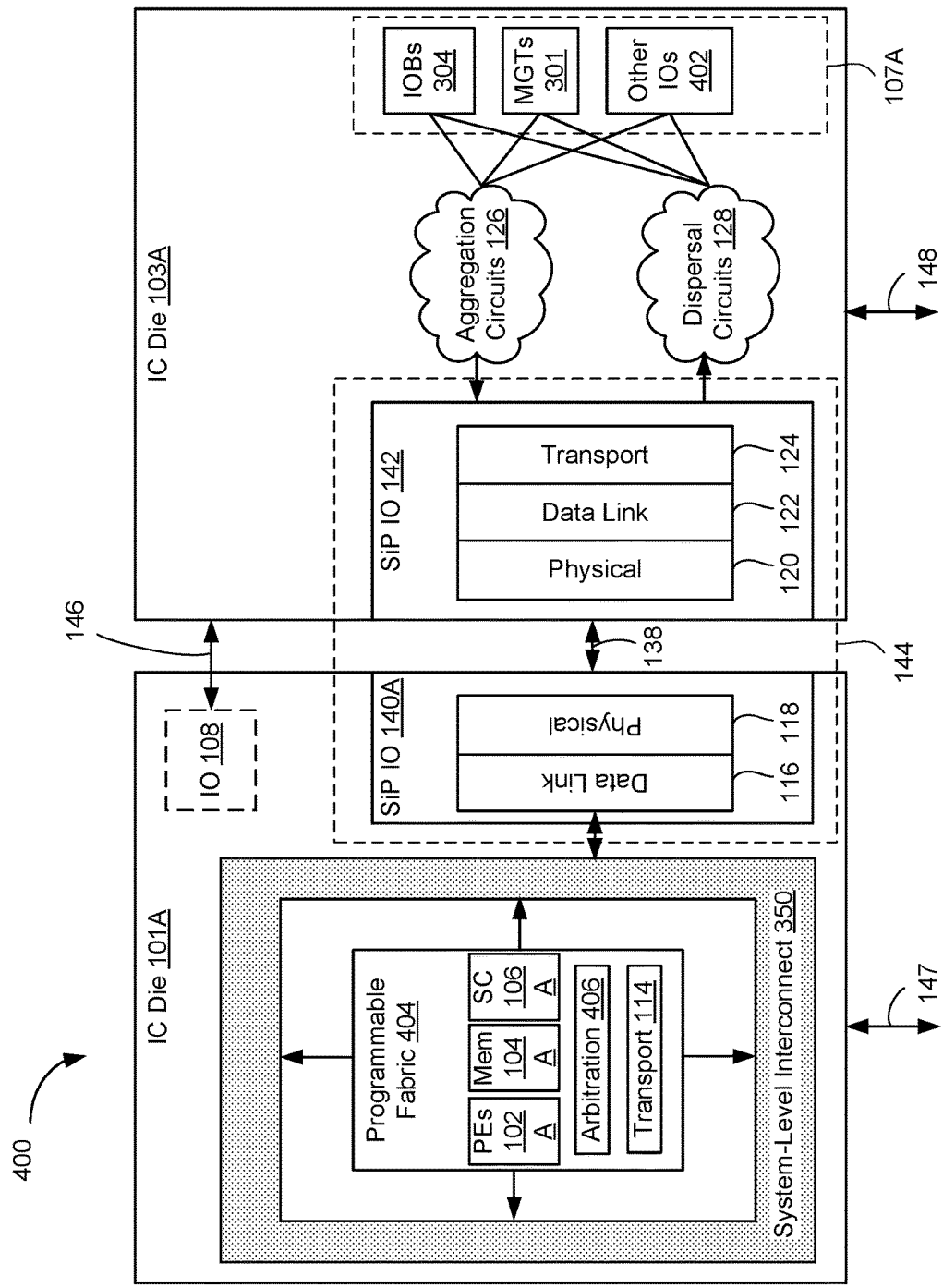
FIG. 4 is a block diagram depicting an IC system according to another example.

FIG. 4 is a block diagram depicting an IC system 400 according to another example. Elements in FIG. 4 that are the same or similar to those of FIGS. 1 and 3 are designated with identical reference numerals. In the IC system 400, an IC die 101A is an FPGA die having a programmable fabric 404 coupled to the system-level interconnect 350. An IC die 103A is an application specific integrated circuit (ASIC) die comprising application IO 107A (also referred to as a "companion IC"). While the IC die 103A is described as having application IO 107A, in general, the IC die 103A can include application circuitry, which may include IO circuitry and/or other types of circuitry. The system-level interconnect 350 is coupled to an internal interface of SiP IO 140A. The system-level interconnect 350 performs the functions of the aggregation circuits 110 and the dispersal circuits 112 described above. The SiP IO 140A is similar to the SiP IO 140 described above, but without the transport logic 114 and a portion of the data link logic 116. Rather, the transport logic 114 is implemented in the programmable fabric 404. For example, the programmable fabric 404 can be configured with circuits, such as PEs 102, that can implement the transport logic 114. The PEs 102 can be coupled to and use the memory 104 (e.g., BRAMs 303) and/or the support circuits 106 (e.g., DSPs 306). In another example, the PEs 102, the memory 104, and the support circuits 106 can also implement arbitration logic 406 for the data link logic 116. The SiP IO 140A includes multiplexing logic of the data link logic 116 and the physical logic 118. In yet another example, the programmable fabric 404 can implement both the arbitration logic 406 and the transport logic 114.

In the example of FIG. 4, the system-level interconnect 350 is shown as a ring surrounding all four sides of the programmable fabric 404. The programmable fabric 404 is coupled to the system-level interconnect 350 on top, bottom, left, and right sides thereof. In other example discussed further below, the system-level interconnect 350 can have other forms, such as different implementations of an SIR. In another example, the system-level interconnect 350 can include a network-on-chip (NoC) or the like.

In an example, the programmable fabric 404 does not include any application IO. Rather, application IO 107A in the IC die 103A include the application IO, such as IOBs 304, MGTs 301, and any other IOs 402 (e.g., memory IOs, custom IOs, etc.). The application IO 107A is coupled to the aggregation circuits 126 and the dispersal circuits 128. Circuits configured in the programmable fabric 404 can exchange data with the application IO 107A through the system-level interconnect 305 and the SiP bridge 144. In some examples, the IC die 101A also includes dedicated IO 108, such as configuration IO, JTAG IO, and the like. Some or all of this dedicated IO 108 can also be coupled to the IC die 103A.

Figure 5:
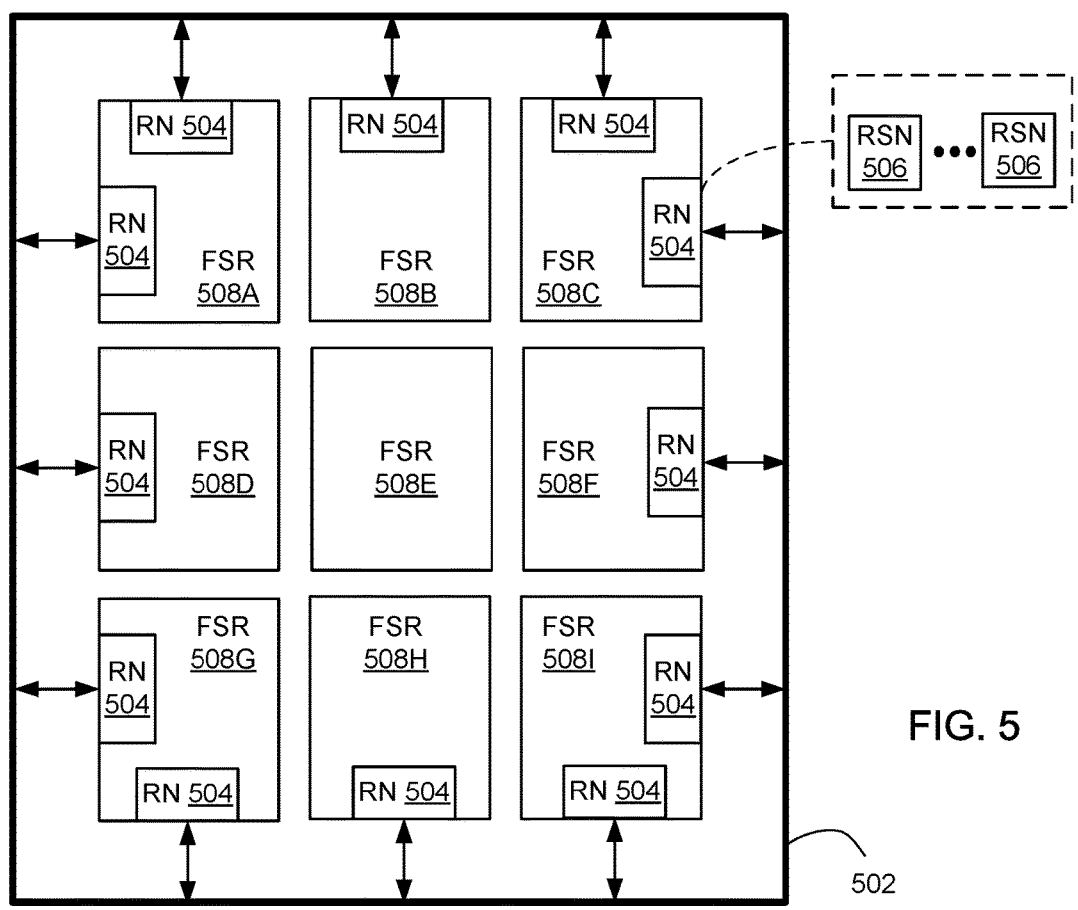
FIG. 5 is a block diagram depicting a more detailed view of the IC die of FIG. 4 according to an example.

FIG. 5 is a block diagram depicting a more detailed view of the IC die 104A according to an example. In particular, the programmable fabric 404 is shown as including nine fabric sub-regions (FSRs) 508A, 508B, . . . , 508I (collectively FSRs 508). In general, the programmable fabric 404 can include any number of FSRs. Each FSR 408 includes columns of CLBs, BRAMs, DSPs, and the like, similar to the programmable fabric shown in FIG. 3. Further, each of the FSRs 508 includes zero or more ring nodes (RNs) 504. The FSRs 508 in the center of the fabric (e.g., FSR 508E) do not include any RNs 504. The FSRs 508 along the inner edges of the fabric include one RN 504 (e.g., the FSRs 508B, 508D, 508F, and 508H). The FSRs 508 at the corners of the fabric include two RNs 504. Each RN 504 includes a plurality of ring sub-nodes (RSNs) 506. As described further below, the RNs 504 displace some of the fabric components in the respective FSRs 508.

The RNs 504 are coupled to wire tracks 502. In the present example, the wire tracks 502 form a ring around the programmable fabric 404. Other interconnect structures can be employed as discussed below. Together, the RNs 504 and the wire tracks 502 form a system-level interconnect that can implement the system-level interconnect 350. In an example, the system-level interconnect supports two channel sets, one for transmitting data from the fabric and one for receiving data to the fabric. For example, the wire tracks 502 can be configured into 256 tracks, allowing for one receive channel set and one transmit channel set each having a width of 128 tracks. Of course, the wire tracks 502 can be configured into more or less than 256 tracks. Each of the RNs 504 is coupled to the wire tracks 502. Each RN 504 includes a router switch that provides a bidirectional interface between the programmable fabric 404 and the system-level interconnect. Circuits configured in the programmable fabric 404 can be coupled to specific wire tracks 502 by programming the RNs 504. The RNs 504 can be programmed using configuration data loaded into the FPGA, or dynamically during operation of the FPGA.

Each RSN 506 comprises a repeatable portion of an RN 504. For example, if the wire tracks 502 are configured into 256 tracks, then an RN 504 can include 8 RSNs 506 each controlling 32 wire tracks. Of course, an RN 504 can include more or less RSNs 506 and the RSNs 506 can control more or less than 32 wire tracks. Each RSN 506 can have the same layout regardless of whether it is part of a RN 504 along a horizontal edge of the programmable fabric 404 or along a vertical edge of the programmable fabric 404. In this manner, the design tools used to design circuits for implementation in the FPGA do not have to distinguish between RNs 504 along a horizontal edge and RNs 504 along a vertical edge. An example structure of an RSN 506 is described below.

Figure 6:
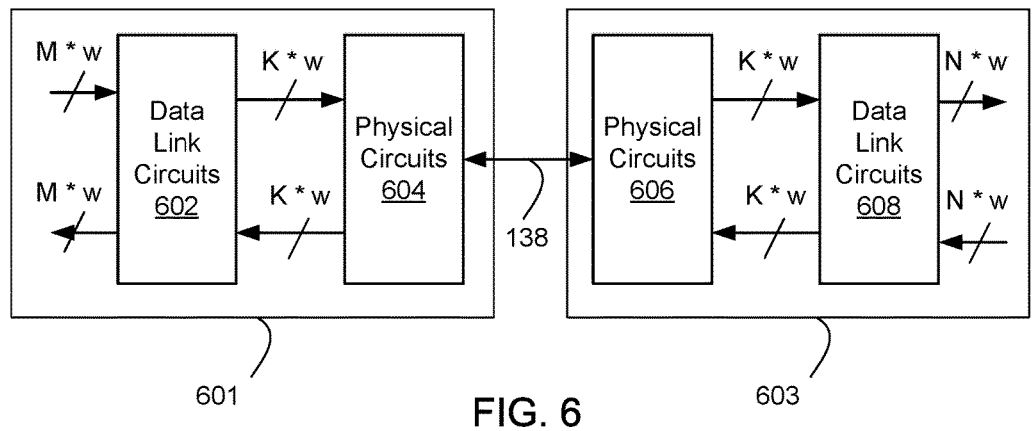
FIG. 6 is a block diagram depicting system-in-package (SiP) stacks according to an example.

FIG. 6 is a block diagram depicting SiP stacks 601 and 603 according to an example. The SiP stack 601 can be part of an SiP IO (e.g., the SiP IO 140 or 140A) and the SiP stack 603 can be part of another SiP IO (e.g., the SiP IO 142 or 142A). For purposes of clarity by example, the transport logic 114/124 is not shown.

The SiP stack 601 includes data link circuits 602 and physical circuits 604. The SiP stack 603 includes data link circuits 608 implementing data link logic and physical circuits 606 implementing physical logic. The physical circuits 604 and 606 form the physical layer. The data link circuits 602 and 608 form the data link layer.

In the example, the SiP stack 601 includes M*w source ports and M*w destination ports. The source ports and destination ports of the data link circuits 602 are coupled to the aggregation circuits 110 and dispersal circuits 112, respectively (e.g., the system-level interconnect 350). The data link circuits 602 include K*w external outputs and K*w external inputs. The external outputs and external inputs of the data link circuits 602 are coupled to the physical circuits 604. The physical circuits 604 are coupled to the physical circuits 606 by the signal paths 138. Depending on the physical layer, the signal paths 138 can include approximately 2*K signal paths. The data link circuits 608 include K*w external inputs and K*w external outputs. The external inputs and outputs of the data link circuits 608 are coupled to the physical circuits 606. The data link circuits 608 include N*w destination ports and N*w source ports. The source ports and destination ports of the data link circuits 608 are coupled to the aggregation circuits 126 and the dispersal circuits 128, respectively.

In operation, the data link circuits 602 multiplexes M aggregation channels of width w into K physical channels of width w. The physical circuits 604 serialize the packets on the K physical channels onto the signal paths 138. The physical circuits 606 de-serialize signals from the signal paths 138 into K physical channels of width w. The data link circuits 608 de-multiplex the K physical channels into N dispersal channels of width w. Operation when transmitting from the data link circuits 608 to the data link circuits 602 (i.e., the reverse direction) is identical.

Figure 7:
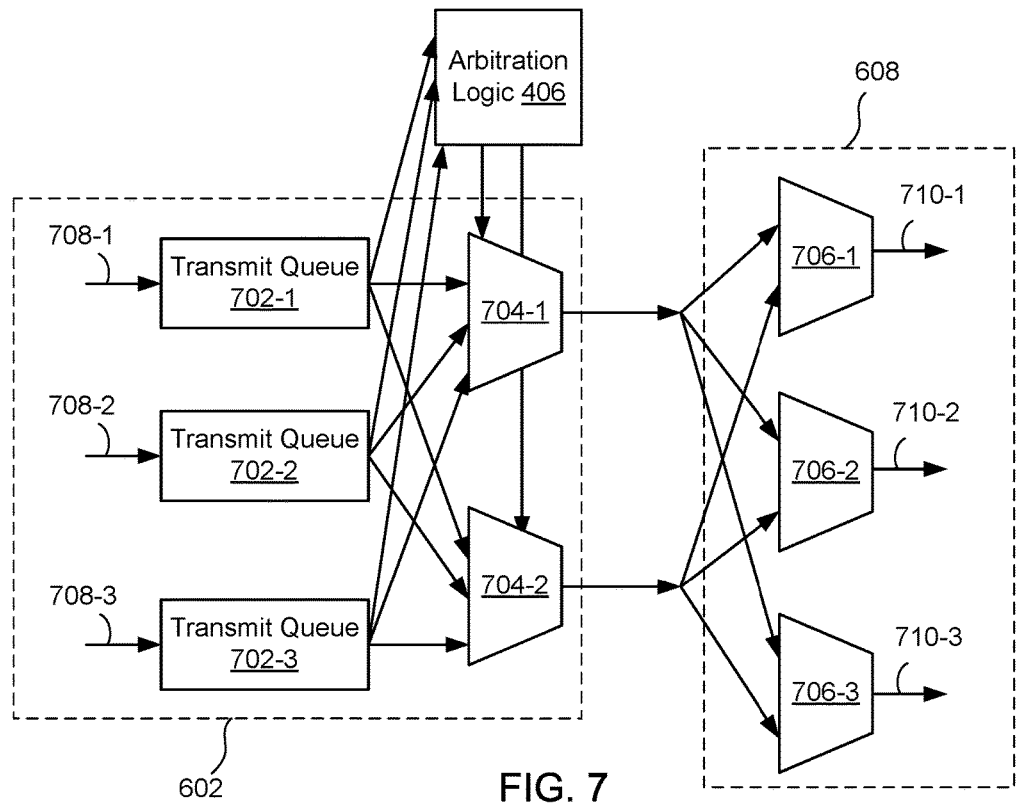
FIG. 7 is a block diagram depicting a data link layer in more detail according to an example.

FIG. 7 is a block diagram depicting the data link layer in more detail according to an example. In the example of FIG. 7, M=N=3 and K=2. The data link circuits 602 include transmit queues 702-1 through 702-3 (collectively transmit queues 702), multiplexers 704-1 and 704-2 (collectively multiplexers 704), and arbitration logic 406. The data link circuits 608 include multiplexers 706-1 through 706-3 (collectively multiplexers 706). Inputs of the transmit queues 702-1 through 702-3 are coupled to source ports 708-1 through 708-3, respectively (collectively source ports 708). Outputs of the multiplexers 706-1 through 706-3 are coupled to destination ports 710-1 through 710-3, respectively (collectively destination ports 710). Control inputs of the multiplexers 704 are coupled to outputs of the arbitration logic 406. Inputs of the arbitration logic 406 are coupled to outputs of the transmit queues 702. In an example, the arbitration logic 406 is implemented separately from the SiP IO, such as in the programmable fabric 404.

In operation, the arbitration logic 406 controls the multiplexers 704 so that there are no destination conflicts of packets transmitted across the K physical channels. Each packet being transmitted includes a destination port. The arbitration logic 406 executes an arbitration algorithm to ensure that no two packets being transmitted in parallel across the K physical channels have the same destination port. Example arbitration algorithms are described below.

Figure 8:
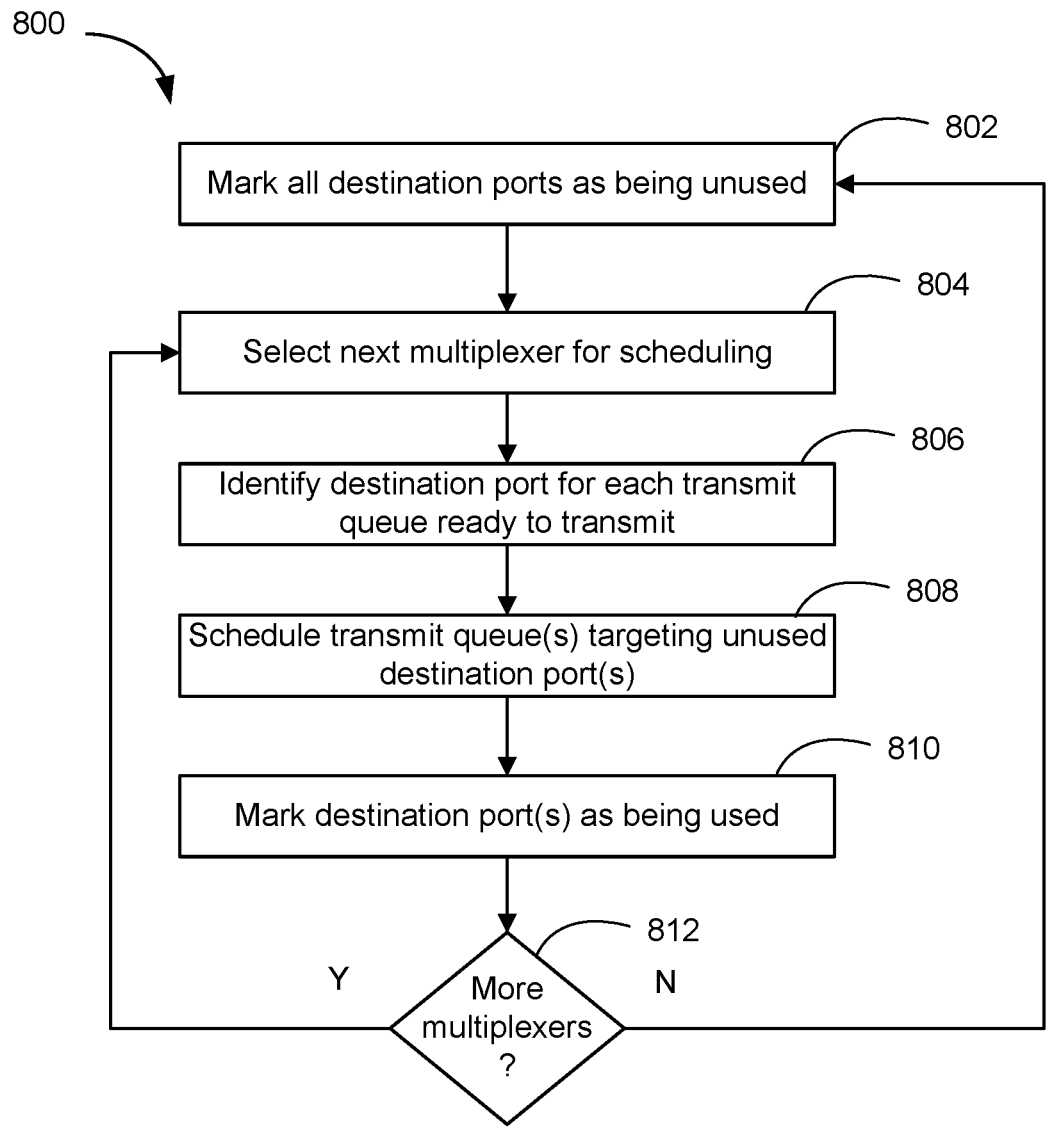
FIG. 8 is a flow diagram depicting a method of arbitration within the data link layer of an SiP bridge according to an example.

FIG. 8 is a flow diagram depicting a method 800 of arbitration within the data link layer of a SiP bridge according to an example. The method 800 can be performed by the arbitration logic 406. The method 800 begins at step 802, where the arbitration logic 406 marks all destination ports as being unused. In the example of FIG. 7, the destination ports comprise outputs 710-1 through 710-3. In general, there can be N destination ports, one for each input channel of the corresponding dispersal circuits.

At step 804, the arbitration logic 406 selects a multiplexer for scheduling. In the example of FIG. 7, there are two multiplexers 704-1 and 704-2 to be scheduled by the arbitration logic 406. In general, there can be K multiplexers 704, one for each physical channel.

At step 806, the arbitration logic 406 identifies a destination port for each transmit queue ready to transmit. In the example of FIG. 7, there are three transmit queues 702-1 through 702-3. In general, there can be M transmit queues, one for each output channel of the corresponding aggregation circuit. If a transmit queue is not empty, the arbitration logic 406 can deem the transmit queue as ready to transmit. Each of the transmit queues 702 stores one or more packets having a particular destination port. The arbitration logic 406 parses the packet(s) to identify the destination ports.

At step 808, the arbitration logic 406 schedules one or more transmit queues targeting unused destination port(s) for transmission. In an example, scheduling can be done in parallel using variations of a maximum matching algorithm. If a transmit queue includes packet(s) for targeting a used destination port, the arbitration logic 406 holds the transmit queue. At step 810, the arbitration logic 406 marks the identified destination ports as being used. At step 812, the arbitration logic determines whether there are more multiplexers to schedule. If so, the method 800 returns to step 804 and selects the next multiplexer. Otherwise, the method 800 returns to step 802 and marks all destination ports as unused. As such, the arbitration logic 406 executes steps 804-812 for each multiplexer to be scheduled (e.g., each of the multiplexers 704). The arbitration logic 406 executes steps 802 through 812 for multiple scheduling rounds. In this manner, the arbitration logic 406 generates and implements schedules for controlling the multiplexers 704 so that the multiplexers 704 multiplex output of the transmit queues 702 such that packets transmitted in parallel over the physical channels have different destination ports and there is no congestion or conflict at the multiplexers 706.

Figure 9:
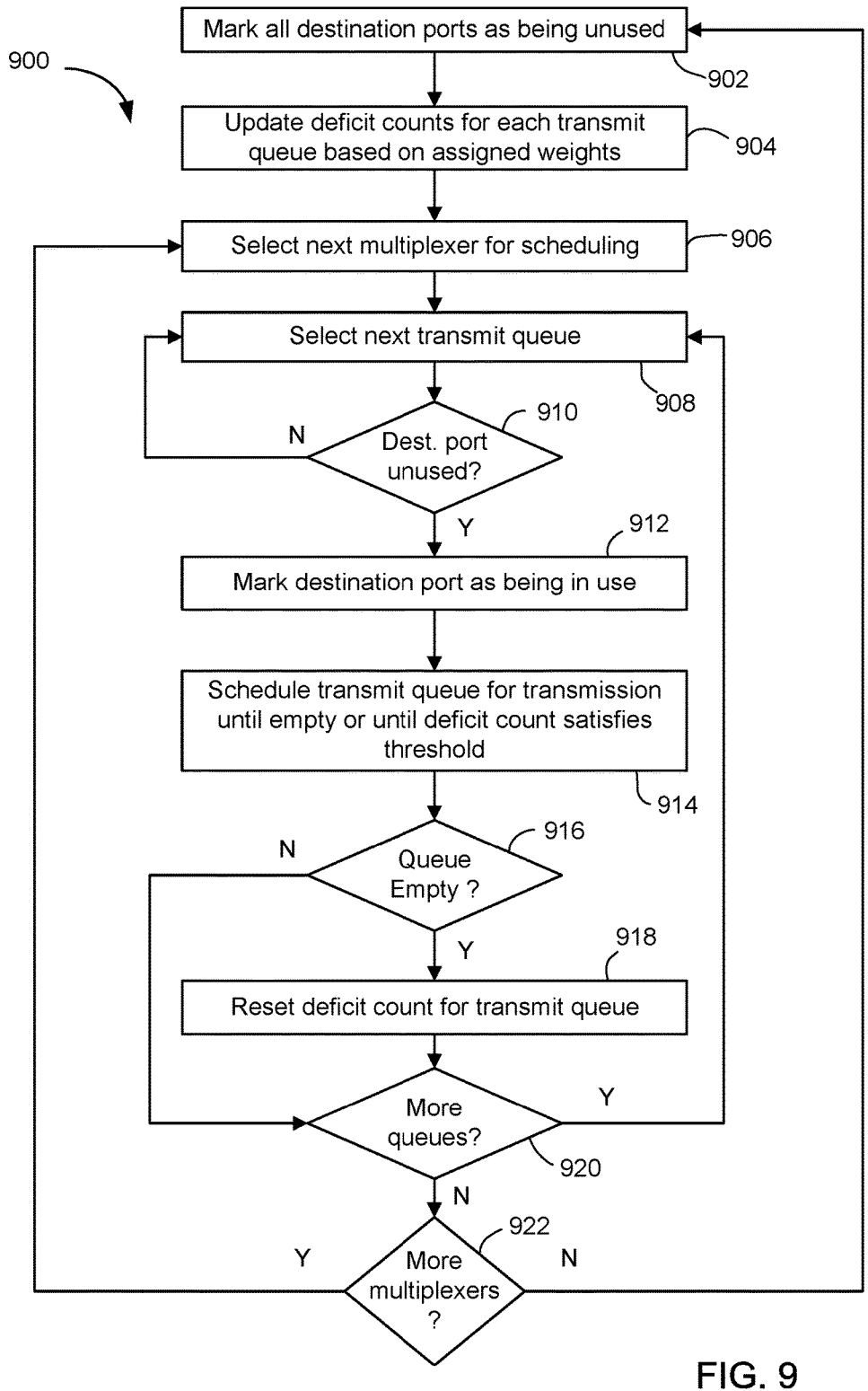
FIG. 9 is a flow diagram depicting a method of arbitration within the data link layer of a SiP bridge according to another example.

FIG. 9 is a flow diagram depicting a method 900 of arbitration within the data link layer of a SiP bridge according to another example. The method 900 can be performed by the arbitration logic 406. The method 900 differs from the method 800 in that the arbitration logic 406 assigns weights to each of the transmit queues 702 and selects packets from the transmit queues for transmission over the physical channels based on the weights in addition to managing destination port conflicts.

The method 900 begins at step 902, where the arbitration logic 406 marks all destination ports as being unused. In the example of FIG. 7, the destination ports comprise outputs 710-1 through 710-3. In general, there can be N destination ports, one for each input channel of the corresponding dispersal circuits.

At step 904, the arbitration logic 406 updates deficit counts for each transmit queue based on assigned weights. That is, the arbitration logic 406 can assign weight to each transmit queue. Some transmit queues can have more weight (higher priority) than other transmit queues. The deficit counts are used to control how many packets are selected from a given transmit queue at a given time during the scheduling.

At step 906, the arbitration logic 406 selects a multiplexer for scheduling. In the example of FIG. 7, there are two multiplexers 704-1 and 704-2 to be scheduled by the arbitration logic 406. In general, there can be K multiplexers 704, one for each physical channel.

At step 908, the arbitration logic 406 selects a transmit queue (e.g., one of the transmit queues 702). At step 910, the arbitration logic 406 determines whether the destination port targeted by packet(s) in the selected transmit queue is unused. If not, the method 900 returns to step 908 and the arbitration logic 406 selects the next transmit queue. Otherwise, the method 900 proceeds to step 912.

At step 912, the arbitration logic 406 marks the identified destination port as being in use. At step 914, the arbitration logic 406 schedules the selected transmit queue for transmission until empty or until the corresponding deficit count satisfies a threshold. A higher deficit count allows more packets to be selected form a given transmit queue than a lower deficit count.

At step 916, the arbitration logic 406 determines whether the selected transmit queue is empty. If so, the method 900 proceeds to step 918, where the arbitration logic 406 resets the deficit count for the selected transmit queue to an initial value. If the selected transmit queue is not empty, the method 900 proceeds instead to step 920.

At step 920, the arbitration logic 406 determines whether there are more transmit queues to be processed in this iteration. If all the transmit queues have been processed, the method 900 proceeds to step 922. Otherwise, the method 900 returns to step 908 and selects the next transmit queue. At step 922, the arbitration logic 406 determines whether there are more multiplexers to be scheduled. If so, the method 900 returns to step 906 and selects the next multiplexer. Otherwise, the method 900 returns to step 902 and marks all destination ports as unused. As such, the arbitration logic 406 executes steps 906-922 for each multiplexer to be scheduled (e.g., each of the multiplexers 704). The arbitration logic 406 executes steps 908-920 for each transmit queue given a selected multiplexer. The arbitration logic 406 executes steps 902-922 for multiple scheduling rounds. In this manner, the arbitration logic 406 generates and implements schedules for controlling the multiplexers 704 so that the multiplexers 704 multiplex output of the transmit queues 702 such that packets transmitted in parallel over the physical channels have different destination ports and there is no congestion or conflict at the multiplexers 706. The arbitration logic 406 also accounts for queue priority and fairness using a weighting scheme.

Figure 10:
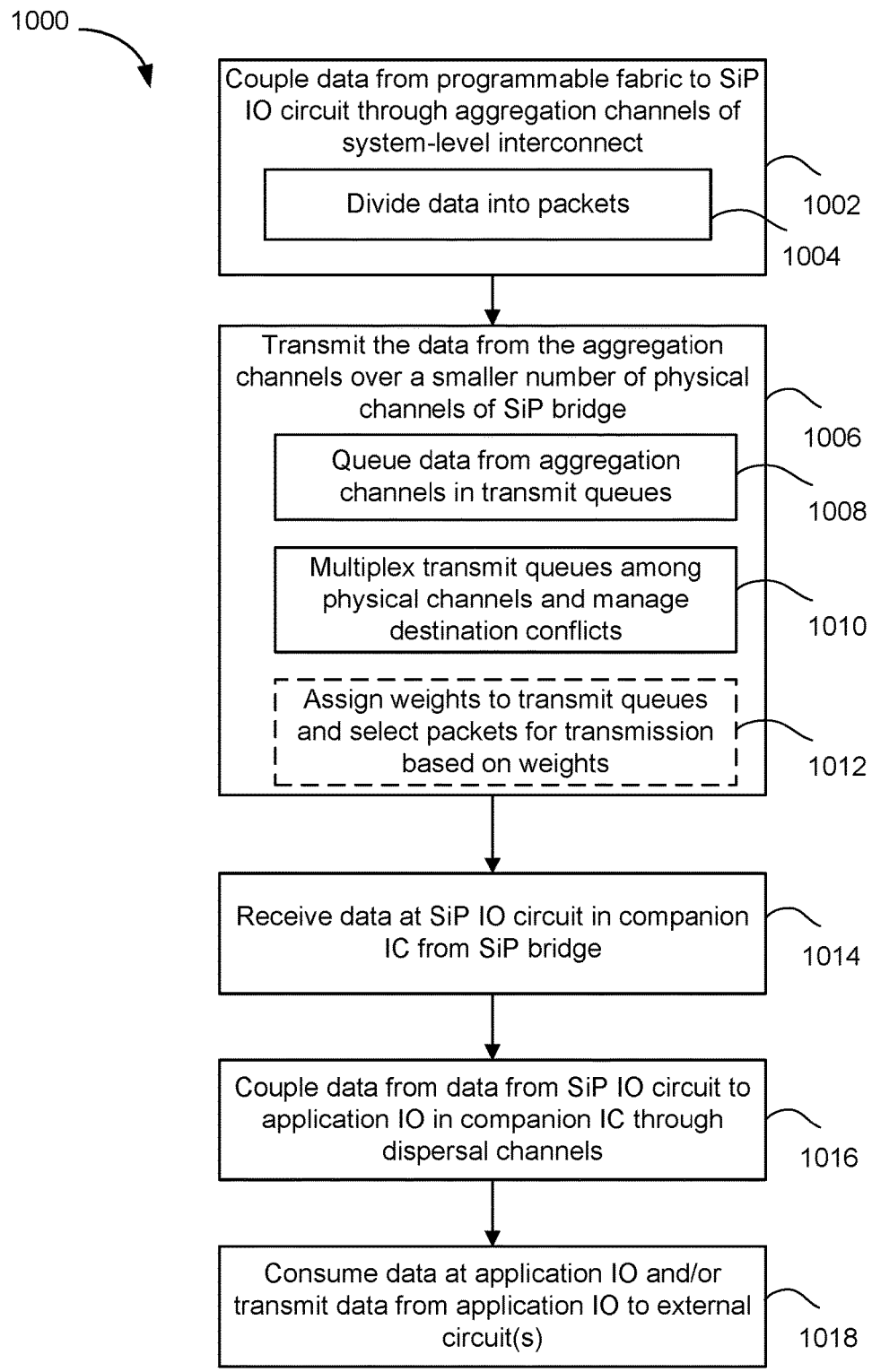
FIG. 10 is a flow diagram depicting a method of transmitting data from a programmable IC in an IC system according to an example.

FIG. 10 is a flow diagram depicting a method 1000 of transmitting data from a programmable IC in an IC system according to an example. The method 1000 may be performed by the IC die 101 to transmit data from the programmable fabric 404 from the IC system 400. The method 1000 begins at step 1002, where the system-level interconnect 350 couples data to the SiP IO 140A through its aggregation channels. In an example, the programmable fabric 404 includes the transport logic 114 configured to divide the data into packets (step 1004).

At step 1006, the SiP IO 140A transmits the data from the aggregation channels over a smaller number of physical channels of the SiP bridge 144. For example, at step 1008, the data link logic 116 queues data from the aggregation channels into transmit queues. At step 1010, the data link logic 116 multiplexes the transmit queues among the physical channels, while the arbitration logic 406 manages destination conflicts. At step 1012, the arbitration logic 406 can also assign weights to the transmit queues and select packets for transmission based on the weights.

At step 1014, the SiP IO 142 in the IC die 103 receives the data from the SiP bridge 144. At step 1016, the dispersal circuits 128 couple the data from the SiP IO 142 to the application IO 107A through the dispersal channels. At step 1018, the application IO 107A consumes the data and/or transmits the data to external circuit(s).

Figure 11:
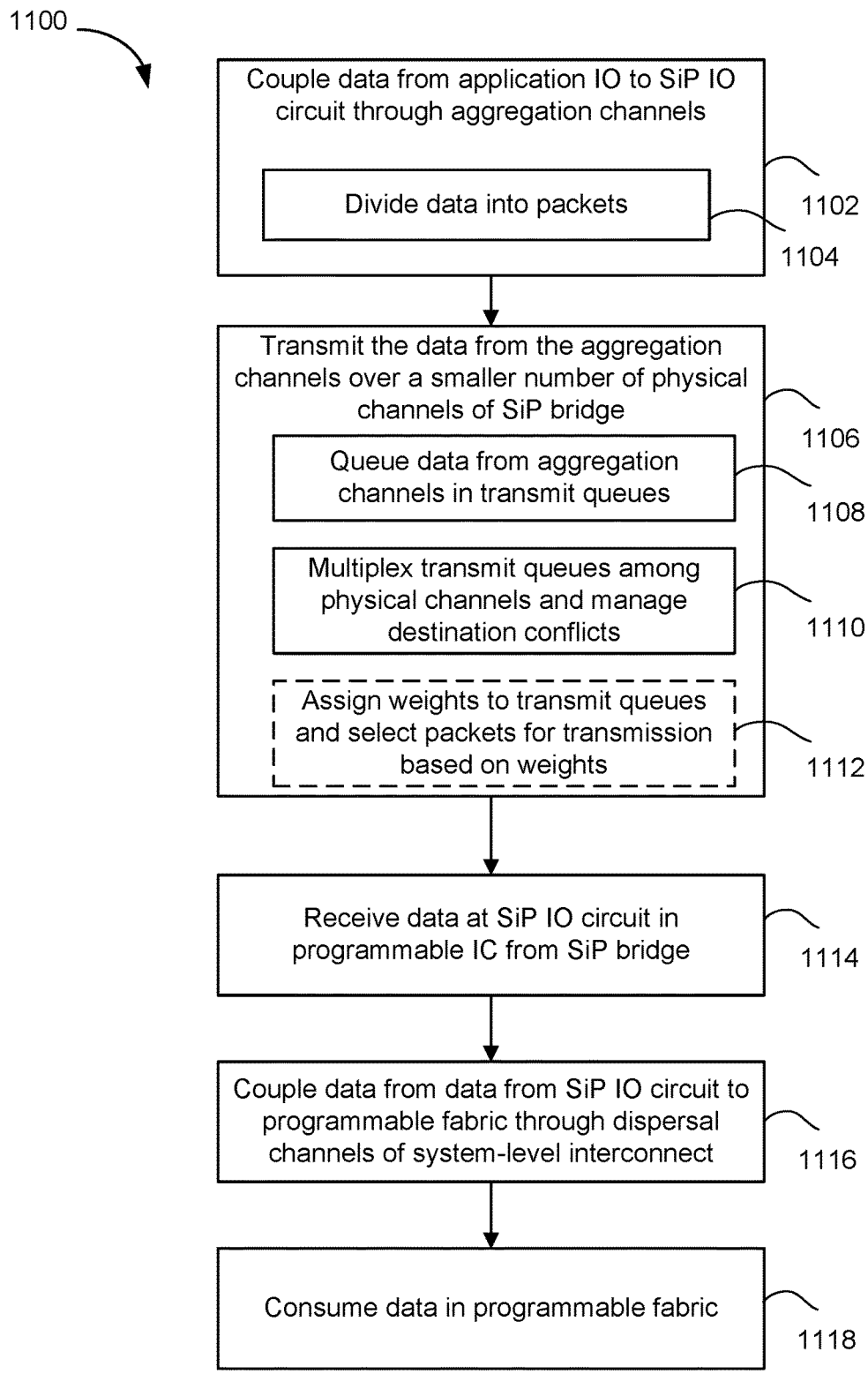
FIG. 11 is a flow diagram depicting a method of receiving data to a programmable IC in an IC system according to an example.

FIG. 11 is a flow diagram depicting a method 1100 of receiving data to a programmable IC in an IC system according to an example. The method 1100 may be performed by the IC die 101 to receive data from the application circuits 107. The method 1100 begins at step 1102, where the aggregation circuits 126 couple data from the application circuits 107 to the SiP IO 142 through aggregation channels. In an example, the SiP IO 142 includes the transport logic 124 configured to divide the data into packets (step 1104).

At step 1106, the SiP IO 142 transmits the data from the aggregation channels over a smaller number of physical channels of the SiP bridge 144. For example, at step 1108, the data link logic 122 queues data from the aggregation channels into transmit queues. At step 1110, the data link logic 122 multiplexes the transmit queues among the physical channels, while manages destination conflicts. At step 1112, the data link logic 122 can also assign weights to the transmit queues and select packets for transmission based on the weights. That is, the data link logic 122 can include arbitration logic similar to the arbitration logic 406.

At step 1114, the SiP IO 140A in the IC die 101 receives the data from the SiP bridge 144. At step 1116, the system-level interconnect 350 couples the data from the SiP IO 140A to the programmable fabric 404 through the dispersal channels. At step 1118, the programmable fabric 404 consumes the data.

Figure 12:
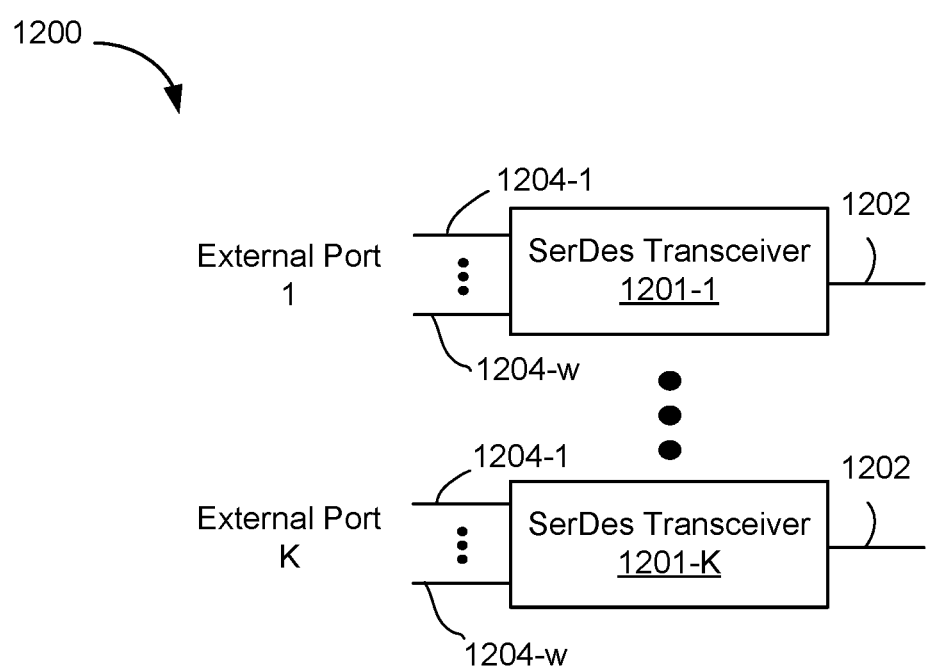
FIG. 12 is a block diagram depicting physical layer logic according to an example implementation.

FIG. 12 is a block diagram depicting physical logic 1200 according to an example implementation. The physical logic 1200 includes a plurality of SerDes transceivers 1201, e.g., SerDes transceivers 1201-1 through 1201-K. Each SerDes transceiver 1201 supports K output physical channels and K input physical channels. Each SerDes transceiver 1201 includes a parallel interface 1204 including a plurality of signal lines, e.g., signal lines 1204-1 through 1204-w. Each SerDes transceiver 1201 includes a serial interface 1202. The parallel interfaces 1204 are coupled to the external ports of the data link circuits, as described above. Each SerDes transceiver 1201 is configured to either serialize its parallel input or de-serialize its serial input.

As noted above, the IC systems described herein can use any type of USR SerDes technology that meets certain requirements. There are three parameters of the physical layer to consider in order of priority: (1) bandwidth per pin; (2) power per bit; and (3) area. A figure of merit (FoM) can be defined for any physical logic that includes the first two factors: FoM=(bandwidth per pin)/(power per bit). In an example, the physical logic described herein can include a FoM greater than or equal to 20 (Gb/s)(pJ/bit).

Figure 13:
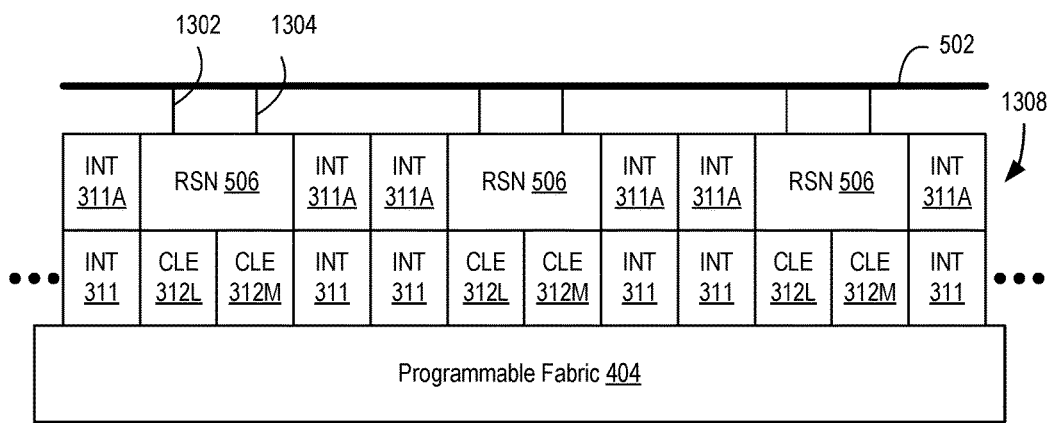
FIG. 13 is a block diagram depicting an integration of system-level interconnect with a horizontal edge of programmable fabric according to an example.

FIG. 13 is a block diagram depicting an integration of the system-level interconnect 350 with a horizontal edge of the programmable fabric 404 according to an example. In the example, the programmable fabric 404 includes a fabric of interconnect elements 311 and CLEs 312. Each CLE 312 includes a slice 312L and a slice 312M. The CLE slices 312L and 312M can include lookup tables (LUTs), multiplexers, flip-flops, combinatorial logic, and the like. The interconnect elements 111 are configured to couple the CLEs 312 to the programmable interconnect (shown and described above in FIG. 3).

The system-level interconnect 350 includes a horizontal edge of the programmable fabric 404 (horizontal fabric edge 1308) and the wire tracks 502. The horizontal fabric edge 1308 includes interconnect elements 311A and RSNs 506. Each RSN 506 occupies a region equivalent to a pair of CLEs 312L and 312M. Each RSN 506 includes switch circuitry coupled to a portion of the wire tracks 502. In particular, each RSN 506 includes clockwise (CW) links 1304 to adjacent circuitry through the wire tracks 502. Each RSN 506 also includes counter-clockwise (CCW) links 1302 to adjacent circuitry through the wire tracks 502. The adjacent circuitry can be an RSN in another RN or the SiP IO 140A depending on the position of the RSN 506. The interconnect elements 311A are configured to couple the RSNs 506 to the programmable interconnect of the programmable fabric 404.

In an example, the wire tracks 502 include 256 tracks as described in the examples above. An RSN 506 is coupled to a portion of the wire tracks 502 in both the CW and CCW directions. For example, an RSN 506 can be coupled to 32 of the wire tracks 502 in each of the CW and CCW directions (e.g., 64 total links). A plurality of the RSNs 506 combine to form an RN 504, which is coupled to all of the wire tracks 502. For example, if the RSNs 506 control 32 wire tracks, then a RN 504 includes 8 RSNs 506.

One or more sets of RSNs 506 may be integrated into the programmable fabric 404 as shown in FIG. 13 to construct one or more RNs 504 along the horizontal edge. For example, each FSR 508 of the programmable fabric 404 can include one RN 504. A portion of the CLEs 312 are removed from the fabric edge 1308 and replaced with the circuitry of the RSNs 506. A portion of the programmable interconnect (e.g., horizontal long wires) is removed to accommodate the wire tracks 502.

Figure 14:
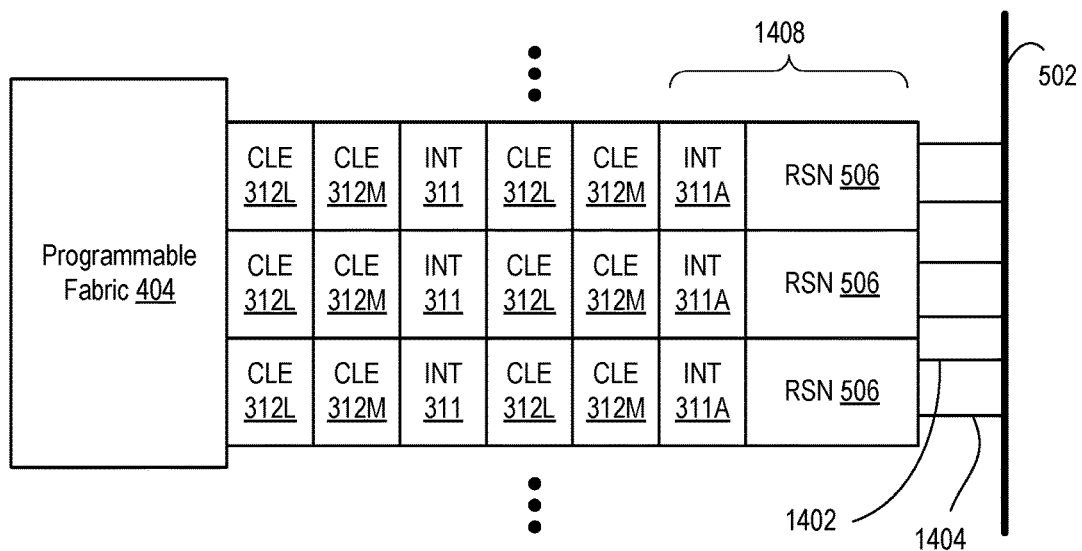
FIG. 14 is a block diagram depicting an integration of system-level interconnect with a vertical edge of programmable fabric according to an example.

FIG. 14 is a block diagram depicting an integration of the system-level interconnect 350 with a vertical edge of the programmable fabric 404 according to an example. In the example, the programmable fabric 404 includes a fabric of interconnect elements 111 and CLEs 312. Each CLE 312 includes a slice 312L and a slice 312M. The CLE slices 312L and 312M can include lookup tables (LUTs), multiplexers, flip-flops, combinatorial logic, and the like. The interconnect elements 311 are configured to couple the CLEs 312 to the programmable interconnect (shown and described above in FIG. 3).

The system-level interconnect 350 includes a vertical edge of the programmable fabric 404 (vertical fabric edge 1408) and the wire tracks 502. The vertical fabric edge 1408 includes interconnect elements 311A and RSNs 506. Each RSN 506 occupies a region equivalent to a pair of CLEs 312L and 312M. Each RSN 506 includes switch circuitry coupled to a portion of the wire tracks 502. In particular, each RSN 506 includes CW links 1404 to adjacent circuitry through the wire tracks 502. Each RSN 506 also includes CCW links 1402 to adjacent circuitry through the wire tracks 502. The adjacent circuitry can be an RSN in another RN or the SiP IO 140A depending on the position of the RSN 506. The interconnect elements 311A are configured to couple the RSNs 506 to the programmable interconnect of the programmable fabric 404.

In an example, the wire tracks 502 may include 256 tracks as described in the examples above. An RSN 506 is coupled to a portion of the wire tracks 502 in both the CW and CCW directions. For example, an RSN 506 can be coupled to 32 of the wire tracks 502 in each of the CW and CCW directions (e.g., 64 total links). A plurality of the RSNs 506 combine to form an RN 504, which is coupled to all of the wire tracks 502. For example, if the RSNs 506 control 32 wire tracks, then a RN 504 includes 8 RSNs 506.

One or more sets of RSNs 506 may be integrated into the programmable fabric 404 as shown in FIG. 14 to construct one or more RNs 504 along the vertical edge. For example, each FSR 508 of the programmable fabric 404 can include one RN 504 along one or both of its vertical edges. A portion of the CLEs 312 are removed from the vertical fabric edge 1408 and replaced with the circuitry of the RSNs 506. A portion of the programmable interconnect (e.g., vertical long wires) is removed to accommodate the wire tracks 502.

Figure 15:
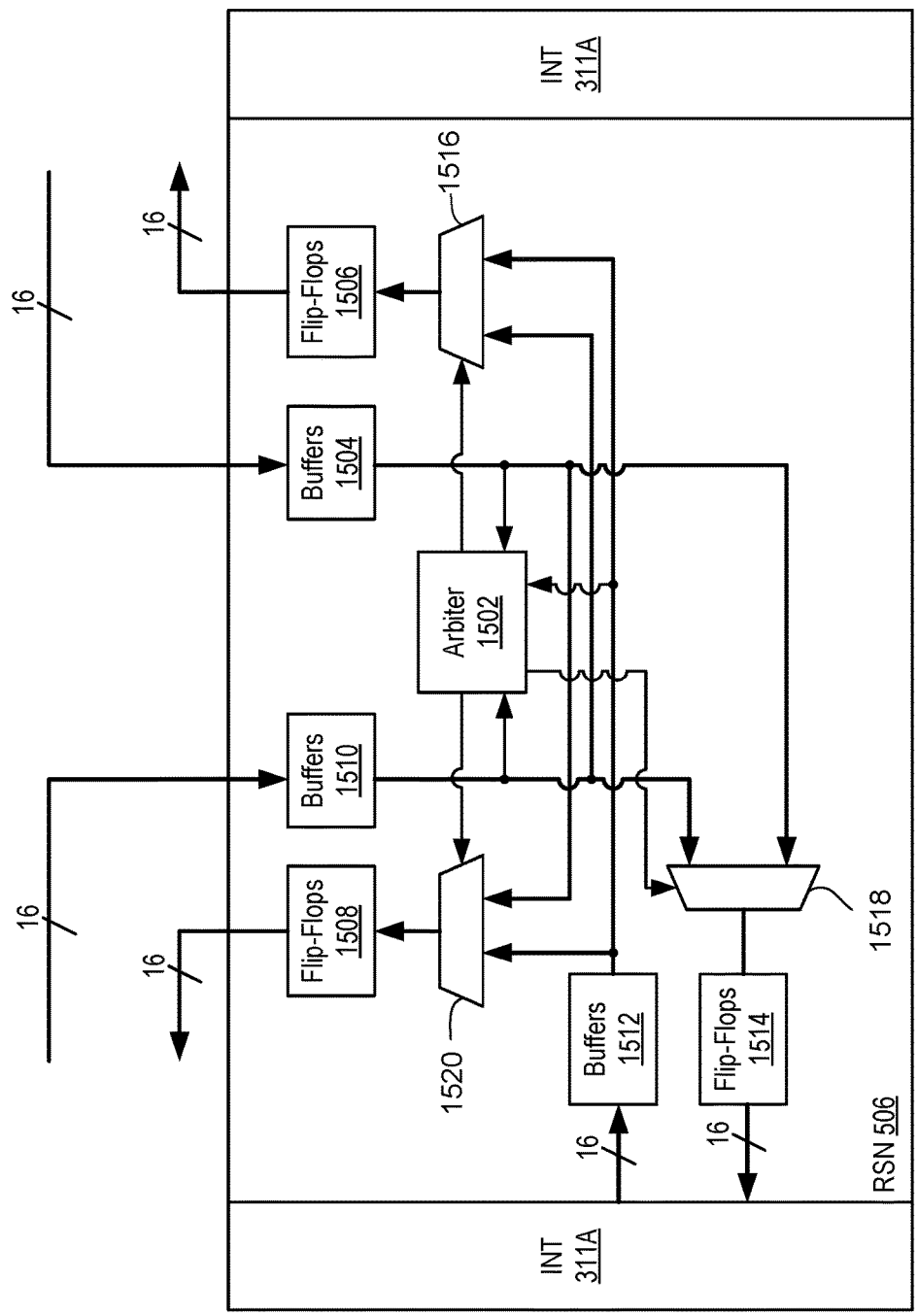
FIG. 15 is a block diagram depicting a ring sub-node of system-level interconnect according to an example.

FIG. 15 is a block diagram depicting a RSN 506 according to an example. The RSN 506 includes an arbiter 1502, buffers 1504, flip-flops 1506, flip-flops 1508, buffers 1510, buffers 1512, flip-flops 1514, a multiplexer 1516, a multiplexer 1518, and a multiplexer 1520. The buffers 1510 receive a 16-bit input from a left-side RSN (e.g., either in the same RN or an adjacent RN). Likewise, the buffers 1504 receive a 16-bit input from a right-side RSN (e.g., either in the same RN or an adjacent RN) or from the SiP IO 140. Outputs of the buffers 1510 and the buffers 1504 are coupled to inputs of the multiplexer 1518. An output of the multiplexer 1518 is coupled to an input of the flip-flops 1514. The flip-flops 1514 include a 16-bit output coupled to an interconnect element 311A.

The buffers 1512 include a 16-bit input coupled to the interconnect element 311A. An output of the buffers 1512 is coupled to an input of the multiplexer 1520 and an input of the multiplexer 1516. Another input of the multiplexer 1520 is coupled to the output of the buffers 1504. Another input of the multiplexer 1516 is coupled to the output of the buffers 1510. An output of the multiplexer 1520 is coupled to an input of the flip-flops 1508. An output of the multiplexer 1516 is coupled to an input of the flip-flops 1506. The flip-flops 1508 include a 16-bit output coupled to the left-side RSN. The flip-flops 1506 include a 16-bit output coupled to the right-side RSN or the SiP IO 140A. Control inputs of the multiplexers 1516, 1518, and 1520 are coupled to outputs of the arbiter 1502. Inputs of the arbiter 1502 are coupled to the outputs of the buffers 1504, 1510, and 1512.

In operation, the RSN 506 buffers input from the programmable fabric 404 through the interconnect element 311A using the buffers 1512. The arbiter 1502 routes the buffered input either to the flip-flops 1508 or the flip-flops 1506. The flip-flops 1506 are coupled to the wire tracks 502 through CW links. The flip-flops 1508 are coupled to the wire tracks 502 through CCW links. The flip-flops 1506 and 1508 register the data for transmission to adjacent circuitry (e.g., either an adjacent RSN or the SiP IO 140A). The RSN 506 also buffers input from adjacent circuitry (e.g., an adjacent RSN or the SiP IO 140A) using the buffers 1504 and 1510. The buffers 1504 are coupled to the wire tracks 502 through CCW links. The buffers 1510 are coupled to the wire tracks 502 through CW links. The arbiter 1502 routes the buffered input from either the buffers 1504 or the buffers 1510 to the flip-flops 1514. The flip-flops 1514 provide registered output to the programmable fabric 404 through the interconnect element 311A. Thus, the RSN 506 implements a 16-bit switch. In other examples, the RSN 504 can implement a switch having a width less than or greater than 16 bits. The layout of the RSN 506 shown in FIG. 15 allows the same RSN implementation to be used along either the horizontal edge or the vertical edge of the programmable fabric 404.

Figure 16A:
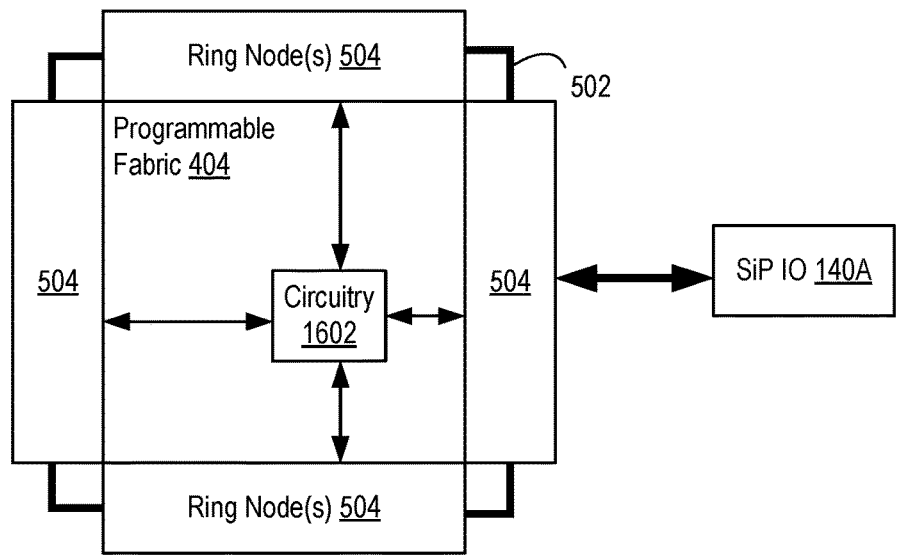
FIGS. 16A through 16F show example system-level interconnect ring (SIR) implementations.

FIGS. 16A through 16F show example SIR implementations of the system-level interconnect 350. As shown in FIG. 16A, the wire tracks 502 include a ring of tracks around the programmable fabric 404. RNs 504 are integrated along both horizontal edges and both vertical edges of the programmable fabric 404. The wire tracks 502 are coupled between the RNs 504 and the SiP IO 140A. Circuitry 1602 configured in the programmable fabric 404 can be coupled to the SiP IO 140A through any of the RNs 504 disposed along any of the edges.

Figure 16B:
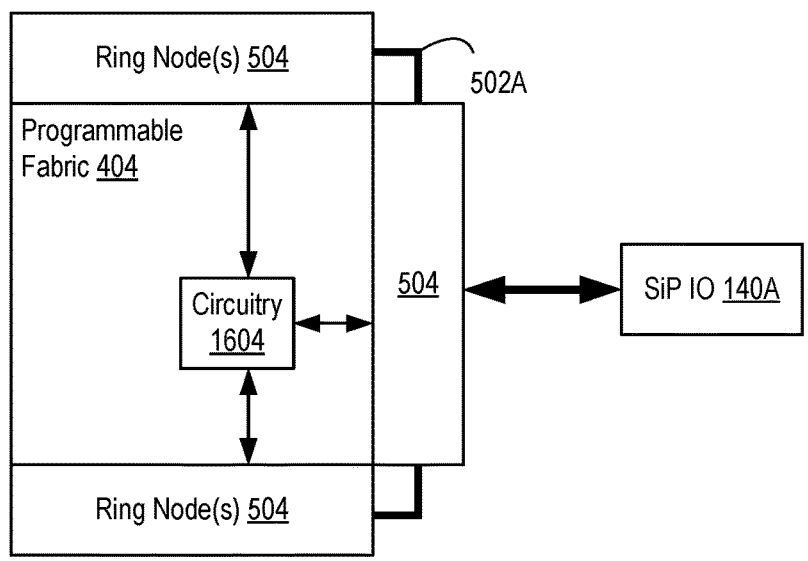

As shown in FIG. 16B, another implementation of the wire tracks (wire tracks 502A) includes a partial ring of tracks around the programmable fabric. In the example shown, the wire tracks 502A surround both horizontal edges and one vertical edge of the programmable fabric 404. In other examples, the wire tracks 502A can surround both vertical edges and one horizontal edge of the programmable fabric 404. In still other examples, the wire tracks 502A can be adjacent to one vertical edge and one horizontal edge. The wire tracks 502A are coupled between the RNs 504 and the SiP IO 140A. Circuitry 1604 configured in the programmable fabric 404 can be coupled to the SiP IO 140A through any of the RNs 504.

Figure 16C:
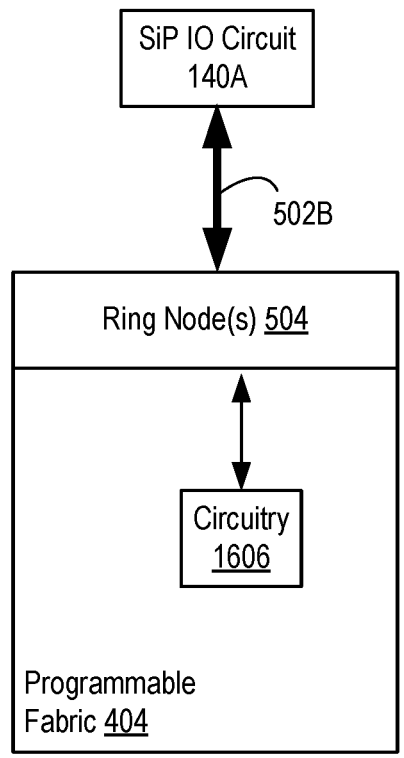

As shown in FIG. 16C, another implementation of the wire tracks (wire tracks 502B) includes tracks adjacent to one horizontal edge of the programmable fabric 404. The wire tracks 502B is coupled between the RNs 504 and the SiP IO 140A. Circuitry 1606 configured in the programmable fabric 404 can be coupled to the SiP IO 140A through any of the RNs 504.

Figure 16D:
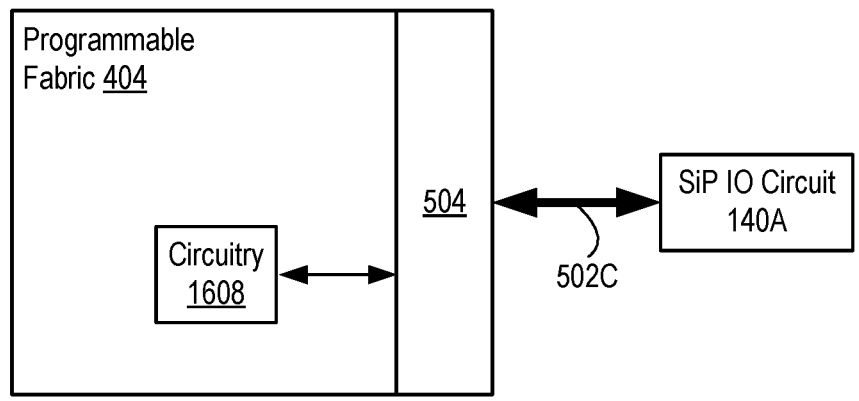

As shown in FIG. 16D, another implementation of the wire tracks (wire tracks 502C) includes tracks adjacent to one vertical edge of the programmable fabric 404. The wire tracks 502C are coupled between the RNs 504 and the SiP IO 140A. Circuitry 1608 configured in the programmable fabric 404 can be coupled to the SiP IO 140A through any of the RNs 504.

Figure 16E:
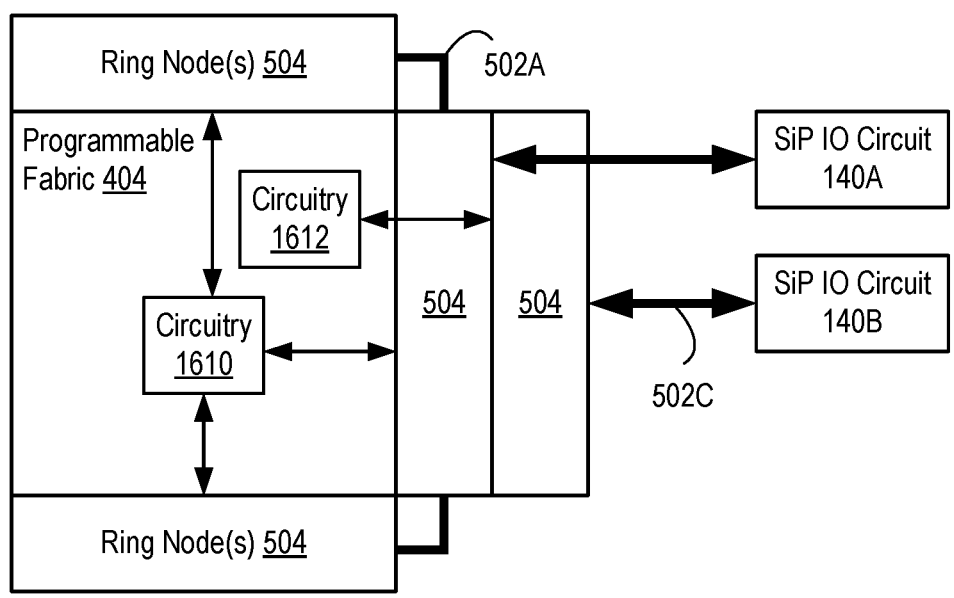

As shown in FIG. 16E, another implementation of an SIR includes two sets of wire tracks 502A and 502C. The wire tracks 502A are adjacent to one or more sides of the programmable fabric 404 (e.g., two horizontal and one vertical side as shown). The wire tracks 502C are adjacent to one or more sides of the programmable fabric 404 (e.g., one vertical side as shown). The wire tracks 502A are coupled between RNs 504 and the SiP IO 140A. The wire tracks 502C are coupled between another set of RNs 504 and another SiP IO circuit 104B. Circuitry 1610 configured in the programmable fabric 404 can be coupled to the SiP IO 140A through any of the RNs 504 coupled to the wire tracks 502A. Circuitry 1612 configured in the programmable fabric 404 can be coupled to the SiP IO circuit 140B through any of the RNs 504 coupled to the wire tracks 502C.

Figure 16F:
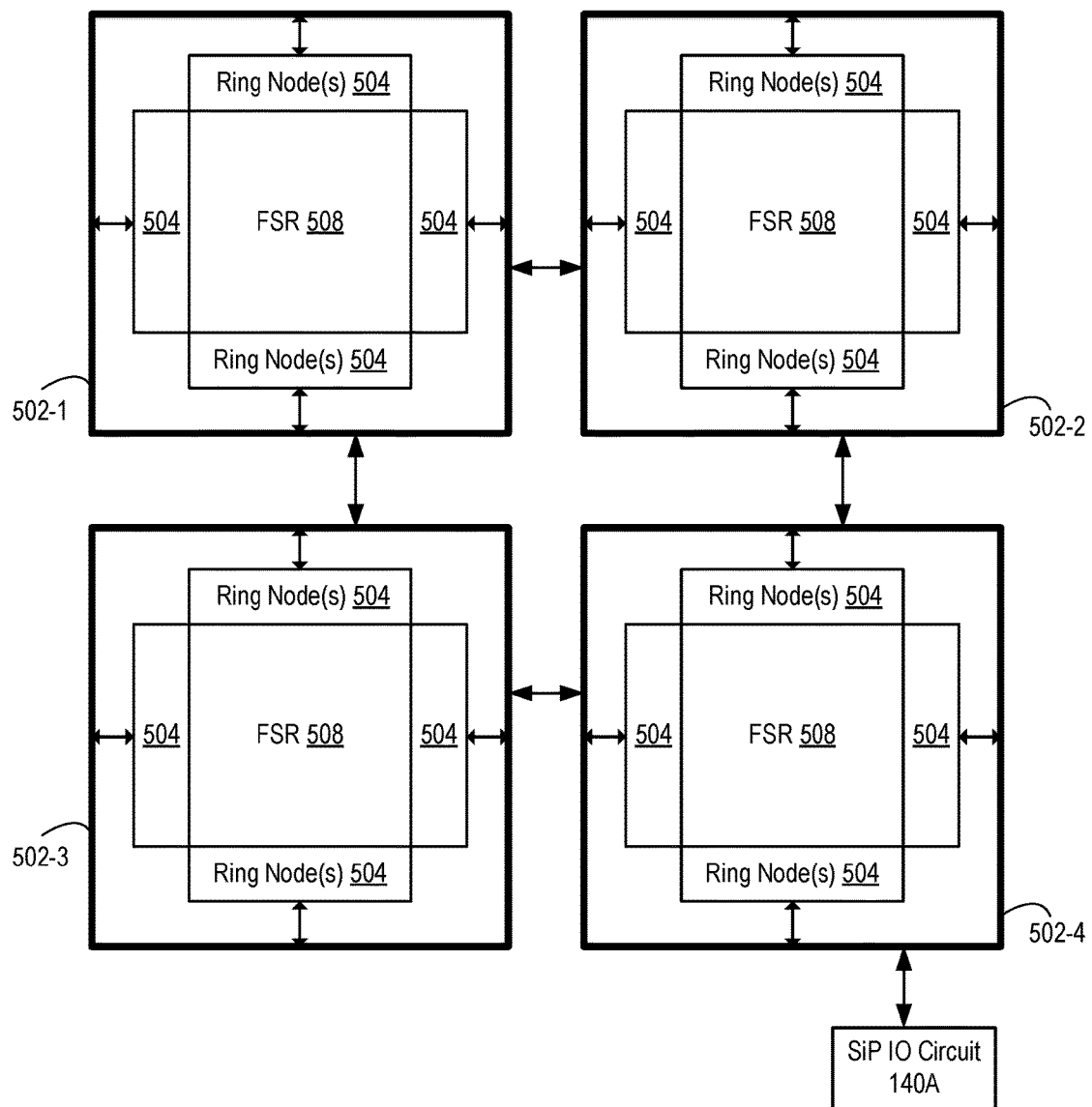

As shown in FIG. 16F, another implementation of an SIR includes a mesh of wire tracks 502 (e.g., wire tracks 502-1 through 502-4). Each set of wire tracks 502 surrounds one or more FSRs 508 of the programmable fabric 404. The wire tracks 502 are interconnected as a mesh. Each FSR 508 includes RNs 504 disposed along one or more edges thereof. The RNs 504 are coupled to the respective wire tracks 502-1 through 502-4. The mesh of wire tracks 502 are coupled to the SiP IO 140A. Circuitry (not shown) configured in any of the FSRs 508 can be coupled to the SiP IO 140A through one or more RNs 504 and one or more wire tracks 502-1 through 502-4. While four wire track rings are shown, the SIR can include more or less than four wire track rings.

Figure 17:
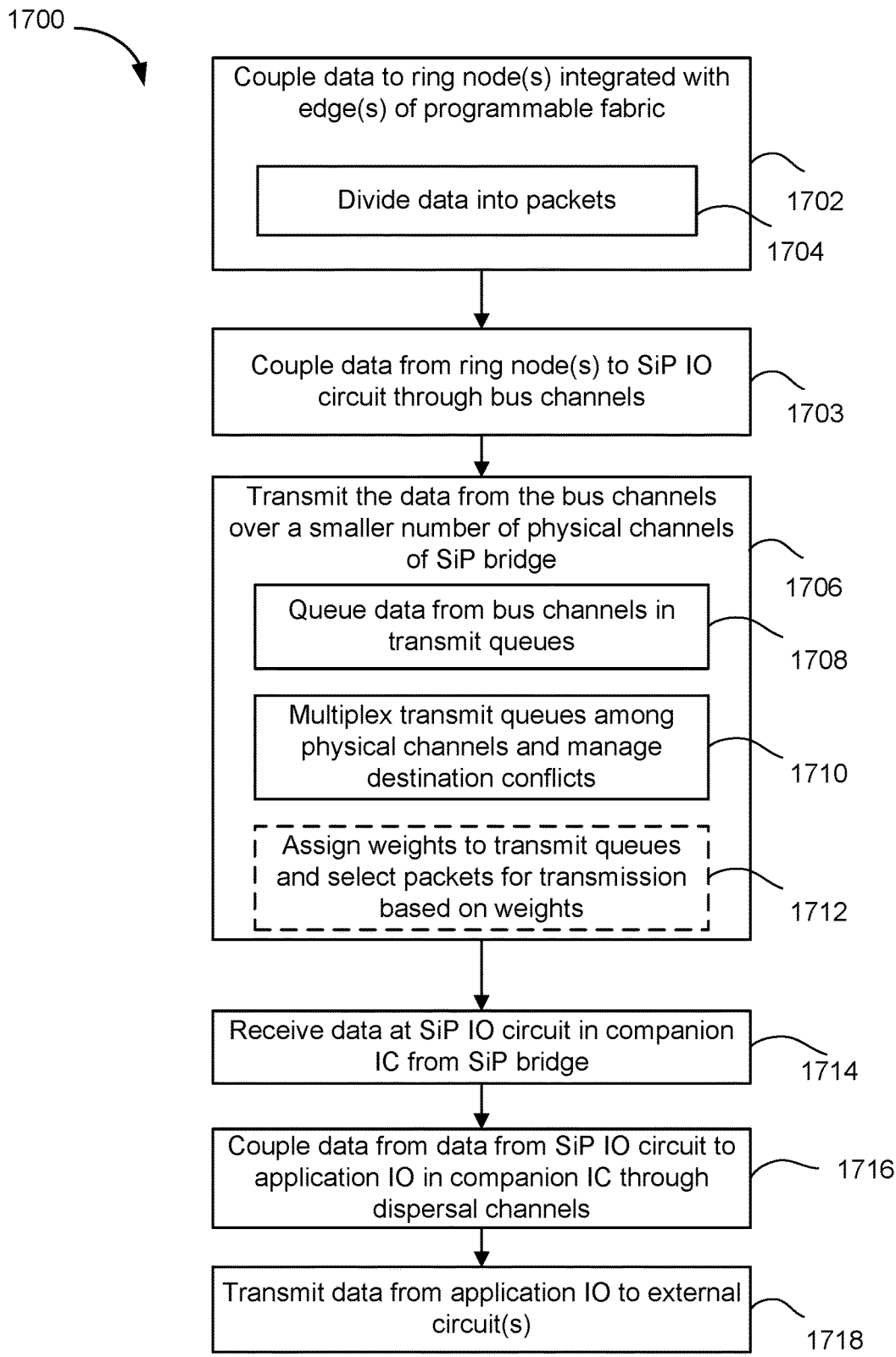
FIG. 17 is a flow diagram depicting a method of transmitting data from a programmable IC in an IC system according to an example.

FIG. 17 is a flow diagram depicting a method 1700 of transmitting data from a programmable IC in an IC system according to an example. The method 1700 may be performed by the IC die 101 to transmit data from the programmable fabric 404 from the IC system 400. The method 1700 begins at step 1702, circuitry in the programmable fabric couples data to ring node(s) 504 integrated with edges of the programmable fabric. At step 1703, the ring node(s) 504 couple the data to the SiP IO 140A through channels of the wire tracks 502. In an example, the programmable fabric 404 includes the transport logic 114 configured to divide the data into packets (step 1704).

At step 1706, the SiP IO 140A transmits the data from the bus channels over a smaller number of physical channels of the SiP bridge 144. For example, at step 1708, the data link logic 116 queues data from the bus channels into transmit queues. At step 1710, the data link logic 116 multiplexes the transmit queues among the physical channels, while the arbitration logic 406 manages destination conflicts. At step 1712, the arbitration logic 406 can also assign weights to the transmit queues and select packets for transmission based on the weights.

At step 1714, the SiP IO 142 in the IC die 103 receives the data from the SiP bridge 144. At step 1716, the dispersal circuits 128 couple the data from the SiP IO 142 to the application IO 107A through the dispersal channels. At step 1718, the application IO 107A transmits the data to external circuit(s).

While the foregoing is directed to specific examples, other and further examples may be devised without departing from the basic scope thereof, and the scope thereof is determined by the claims that follow.

What is claimed is:

1. An integrated circuit (IC) system, comprising:
a package substrate having a programmable integrated circuit (IC) die and a companion IC die mounted thereon, the programmable IC die including a programmable fabric and the companion IC die including application circuitry;
a system-in-package (SiP) bridge including a first SiP IO circuit disposed in the programmable IC die, a second SiP IO circuit disposed in the companion IC die, and conductive interconnect on the package substrate electrically coupling the first SiP IO circuit and the second SiP IO circuit;
first aggregation and first dispersal circuits in the programmable IC die coupled between the programmable fabric and the first SiP IO circuit; and
second aggregation and second dispersal circuits in the companion IC die coupled between the application IO and the second SiP IO circuit;
wherein the first and second SiP IO circuits are configured to multiplex multi-channel output of the first and second aggregation circuits, respectively, onto a first plurality of physical channels implemented over the conductive interconnect; and de-multiplex input from a second plurality of channels implemented over the conductive interconnect onto multi-channel input of the first and second dispersal circuits, respectively.

2. The IC system of claim 1, wherein the first aggregation and the first dispersal circuits comprise a system level interconnect coupled between programmable interconnect of the programmable fabric and the SiP IO circuit.

3. The IC system of claim 2, wherein the system-level interconnect comprises a network-on-chip (NoC).

4. The IC system of claim 1, wherein the programmable IC die comprises a direct connection to the companion IC die separate from the SiP bridge.

5. The IC system of claim 1, wherein the programmable IC die includes arbitration logic, and wherein the first SiP IO circuit comprises a data link circuit and a transceiver circuit, where:
an internal interface of the data link circuit is coupled to the first aggregation and the first dispersal circuits;
an external interface of the data link circuit is coupled to an internal interface of the transceiver circuit;
an external interface of the transceiver circuit is coupled to the conductive interconnect; and
a control interface of the data link circuit is coupled to the arbitration logic.

6. The IC system of claim 5, wherein the arbitration logic is implemented within the programmable fabric of the programmable IC die.

7. The IC system of claim 1, wherein the programmable IC die includes transport logic configured to packetize data transmitted to the first aggregation circuit and de-packetize data received from the first dispersal circuit.

8. The IC system of claim 7, wherein the transport logic is implemented within the programmable fabric of the programmable IC die.

9. A programmable integrated circuit (IC), comprising:
a system-in-package (SiP) input/output (IO) circuit configured to be coupled to a companion IC through external conductive interconnect;
a programmable fabric without at least a portion of application circuitry; and
aggregation and dispersal circuits coupled between the programmable fabric and the SiP IO circuit;
wherein the aggregation and the dispersal circuits comprise a system-level interconnect coupled between programmable interconnect of the programmable fabric and the SiP IO circuit; and
wherein the system-level interconnect comprises a network-on-chip (NoC).

10. The programmable IC of claim 9, wherein the programmable fabric is directly connected to the companion IC separate from the SiP IO circuit.

11. The programmable IC of claim 9, wherein the programmable fabric is configured to implement arbitration logic, and wherein the SiP IO circuit comprises a data link circuit and a transceiver circuit, where:
an internal interface of the data link circuit is coupled to the aggregation and the dispersal circuits;
an external interface of the data link circuit is coupled to an internal interface of the transceiver circuit;
an external interface of the transceiver circuit is coupled to the external conductive interconnect; and
a control interface of the data link circuit is coupled to the arbitration logic.

12. The programmable IC of claim 9, wherein the programmable fabric is configured to implement transport logic that packetizes data transmitted to the aggregation circuit and de-packetizes data received from the dispersal circuit.

13. A method of transmitting data from a programmable integrated circuit (IC) in an IC system, the method comprising:
coupling the data to a first system-in-package (SiP) IO circuit through a plurality of channels of an aggregation circuit in the programmable IC;
transmitting the data from the plurality of channels by multiplexing the data over a smaller number of physical channels implemented over a conductive interconnect between the programmable IC and a companion IC;
receiving the data from the plurality of physical channels at a second SiP IO circuit in the companion IC; and
coupling the data from the second SiP IO circuit to application circuitry in the companion IC by demultiplexing the data through a plurality of channels of a dispersal circuit in the companion IC.

14. The method of claim 13, wherein the data is divided into packets.

15. The method of claim 14, wherein the second SiP IO circuit includes a plurality of internal output ports coupled to the respective plurality of channels of the dispersal circuit, and wherein the packets each have a destination port selected from one of the plurality of internal output ports.

16. The method of claim 15, wherein the step of transmitting comprises:
queuing the data from the plurality of channels of the aggregation circuit in a respective plurality of transmit queues; and
multiplexing output of the transmit queues among the plurality of physical channels such that packets transmitted in parallel over the plurality of physical channels have different destination ports.

17. The method of claim 16, wherein the step of multiplexing further comprises:
assigning weights to each of the plurality of transmit queues; and
selecting packets from the transmit queues for transmission over the plurality of physical channels based on the weights.

18. An integrated circuit (IC) system, comprising:
a package substrate having a programmable integrated circuit (IC) die and a companion IC die mounted thereon, the programmable IC die including a programmable fabric and the companion IC die including application circuitry;
a system-in-package (SiP) bridge including a first SiP IO circuit disposed in the programmable IC die, a second SiP IO circuit disposed in the companion IC die, and conductive interconnect on the package substrate electrically coupling the first SiP IO circuit and the second SiP IO circuit;
first aggregation and first dispersal circuits in the programmable IC die coupled between the programmable fabric and the first SiP IO circuit; and
second aggregation and second dispersal circuits in the companion IC die coupled between the application IO and the second SiP IO circuit;
wherein the programmable IC die comprises a direct connection to the companion IC die separate from the SiP bridge.

19. An integrated circuit (IC) system, comprising:
a package substrate having a programmable integrated circuit (IC) die and a companion IC die mounted thereon, the programmable IC die including a programmable fabric and the companion IC die including application circuitry;
a system-in-package (SiP) bridge including a first SiP IO circuit disposed in the programmable IC die, a second SiP IO circuit disposed in the companion IC die, and conductive interconnect on the package substrate electrically coupling the first SiP IO circuit and the second SiP IO circuit;
first aggregation and first dispersal circuits in the programmable IC die coupled between the programmable fabric and the first SiP IO circuit; and
second aggregation and second dispersal circuits in the companion IC die coupled between the application IO and the second SiP IO circuit;
wherein the programmable IC die includes arbitration logic, and wherein the first SiP IO circuit comprises a data link circuit and a transceiver circuit, where:
an internal interface of the data link circuit is coupled to the first aggregation and the first dispersal circuits;
an external interface of the data link circuit is coupled to an internal interface of the transceiver circuit;
an external interface of the transceiver circuit is coupled to the conductive interconnect; and
a control interface of the data link circuit is coupled to the arbitration logic.

* * * * *